US008510328B1

(12) United States Patent  
Hatton

(10) Patent No.: US 8,510,328 B1  
(45) Date of Patent: Aug. 13, 2013

(54) IMPLEMENTING SYMBOLIC WORD AND SYNONYM ENGLISH LANGUAGE SENTENCE PROCESSING ON COMPUTERS TO IMPROVE USER AUTOMATION

(76) Inventor: Charles Malcolm Hatton, Naperville, IL (US)

( * ) Notice: Subject to any disclaimer, the term of this patent is extended or adjusted under 35 U.S.C. 154(b) by 0 days.

(21) Appl. No.: 13/136,836

(22) Filed: Aug. 13, 2011

(51) Int. Cl.
 *G06F 17/30* (2006.01)
(52) U.S. Cl.
 USPC ............................................. 707/769; 706/45
(58) Field of Classification Search
 CPC ........ G06N 99/005; G06N 5/04; G06Q 10/06
 USPC ...... 707/769; 706/45, FOR. 104, FOR. 118, 706/FOR. 131
 See application file for complete search history.

(56) References Cited

U.S. PATENT DOCUMENTS

| | | | | |
|---|---|---|---|---|
| 4,866,670 A * | 9/1989 | Adachi et al. | ...................... | 704/5 |
| 5,737,617 A * | 4/1998 | Bernth et al. | ...................... | 704/1 |
| 6,098,061 A * | 8/2000 | Gotoh et al. | ...................... | 706/50 |
| 6,269,356 B1 * | 7/2001 | Hatton | ............................. | 706/55 |
| 6,484,155 B1 * | 11/2002 | Kiss et al. | ......................... | 706/46 |
| 6,560,589 B1 * | 5/2003 | Stier et al. | ......................... | 706/50 |
| 6,629,087 B1 * | 9/2003 | Benson et al. | ..................... | 706/11 |
| 6,763,341 B2 * | 7/2004 | Okude | ............................. | 706/45 |
| 7,606,782 B2 * | 10/2009 | Haley | ............................... | 706/50 |
| 7,752,196 B2 * | 7/2010 | Rogers | ........................... | 707/716 |
| 7,904,291 B2 * | 3/2011 | Kamatani et al. | ................. | 704/2 |
| 8,271,264 B2 * | 9/2012 | Gorman et al. | ..................... | 704/9 |
| 8,346,536 B2 * | 1/2013 | Jiang et al. | ........................ | 704/2 |
| 8,374,859 B2 * | 2/2013 | Huang et al. | ................... | 704/231 |
| 2002/0087313 A1 * | 7/2002 | Lee et al. | ...................... | 704/254 |
| 2003/0004706 A1 * | 1/2003 | Yale et al. | ......................... | 704/9 |
| 2003/0204496 A1 * | 10/2003 | Ray et al. | ........................... | 707/3 |
| 2003/0220890 A1 * | 11/2003 | Okude | ............................. | 706/50 |
| 2004/0030421 A1 * | 2/2004 | Haley | .............................. | 700/49 |
| 2004/0215443 A1 * | 10/2004 | Hatton | .............................. | 704/1 |
| 2004/0230636 A1 * | 11/2004 | Masuoka et al. | .............. | 708/800 |
| 2004/0260979 A1 * | 12/2004 | Kumai | ............................. | 714/37 |
| 2006/0184888 A1 * | 8/2006 | Bala | ................................ | 715/762 |
| 2006/0293876 A1 * | 12/2006 | Kamatani et al. | .................. | 704/2 |
| 2007/0055656 A1 * | 3/2007 | Tunstall-Pedoe | ................. | 707/3 |
| 2007/0129935 A1 * | 6/2007 | Uchimoto et al. | ................ | 704/9 |
| 2007/0136246 A1 * | 6/2007 | Stenchikova et al. | ............. | 707/3 |

(Continued)

OTHER PUBLICATIONS

Kemke, C., "Natural Language Communication Between Human and Artificial Agents", PRIMA 2006, LNAI 4088, pp. 84-93 (10 pages), 2006.*

(Continued)

*Primary Examiner* — Phuong Thao Cao
(74) *Attorney, Agent, or Firm* — Charles Malcolm Hatton

(57) ABSTRACT

A software system that automates the use of computing systems by storing English language sentences using synonyms and symbol words to allow user access to computer resources without having to know the technical details or the specifics associated with a body of knowledge. Synonym sentences allow users to get to computer resources using different words stored in different sentences that open the same computer resource (i.e.: a document) to significantly improve a first time request for information. Sentences learned (stored) in text or SQL databases or used in a software agent sentence or search engine sentence are automatically parsed and directed to the appropriate knowledge repository to automated computer processes or to get user information without having to know any technical details required to navigate through computer systems or computer data. Multiple words or sentences can be linked together with computer resources to further automate job tasks.

5 Claims, 18 Drawing Sheets

(56) References Cited

U.S. PATENT DOCUMENTS

| | | | |
|---|---|---|---|
| 2007/0219933 A1* | 9/2007 | Datig | 706/4 |
| 2007/0233660 A1* | 10/2007 | Rogers | 707/3 |
| 2007/0294233 A1* | 12/2007 | Sheu et al. | 707/3 |
| 2008/0097748 A1* | 4/2008 | Haley et al. | 704/9 |
| 2008/0109210 A1* | 5/2008 | Skuratovsky | 704/9 |
| 2008/0134038 A1* | 6/2008 | Oh et al. | 715/727 |
| 2008/0154828 A1* | 6/2008 | Antebi et al. | 706/46 |
| 2009/0125497 A1* | 5/2009 | Jiang et al. | 707/4 |
| 2009/0144609 A1* | 6/2009 | Liang et al. | 715/230 |
| 2009/0265159 A1* | 10/2009 | Li et al. | 704/8 |
| 2010/0049517 A1* | 2/2010 | Huang et al. | 704/251 |
| 2010/0299154 A1* | 11/2010 | Benja-Athon | 705/2 |
| 2011/0004488 A1* | 1/2011 | Benja-Athon | 705/2 |
| 2011/0270603 A1* | 11/2011 | Ovil et al. | 704/9 |
| 2012/0245920 A1* | 9/2012 | Wu | 704/3 |

OTHER PUBLICATIONS

Bobrow, D. G., "Problems in Natural Language Communication with Computers", IEEE Transactions on Human Factors in Electronics, vol. HFE-8, No. 1, Mar. 1967, 4 pages.*

Grimm, S., et al., "Knowledge Representation and Ontologies— Logic, Ontologies and Semantic Web Languages", 2007, pp. 37-87 (51 pages), accessed online at <http://knoesis.wright.edu/pascal/resources/publications/kr-onto-07.pdf> on May 7, 2013.*

* cited by examiner

FIG. 2

Stored English language text used to open a computer application:

1     Q    Please open get the my ele dic edic electronic dictionary application.

2     A    pgm: webdictionary:    This will get the electronic dictionary.

3          menu_item: Please get my ele dic edic electronic dictionary.

FIG. 3

Example of stored English language text used to open an KM SQL repository / database:

1    Q    ****************************************************************

2    A    12-11-2007 Ews ((i)EnglishWorks - acronym for this application) Help Expert.

3    Q    Connect to my ews help expert.

4    A    pgm: ewssqlconnect: "ewshelpexpert" This connects to the ews help expert.

5        menu_hide_item: connect to my ews help expert.

6    Q    Disconnect close from my ews help expert.

7    A    pgm: ewssqldisconnect: "ewshelpexpert" This disconnects from the ews help
8        expert.

9        menu_hide_item: disconnect from my ews help expert.

10    Q    Identify the tables for my ews help expert.

FIG. 4

Computer listing KM text file to open a KM SQL repository / database - continuation of FIG. 3:

1     A    pgm: ewstables: "sentences solutions deductive attachments"    This is the 2            table data used for the ews help expert.

3            menu_hide_item: Identify the tables for my ews help expert.

4     Q    consult with go to get the my internal ews help expert.

5     A    sentences: connect to my ews help expert. Identify the tables for my ews help expert. Assert google url search criterion. Assert googsyn url search criterion.

6            menu_item: get my internal ews help expert.

7     Q    load open get my ews help database db.

8     A    pgm: ewshelpdatabase:   This opens the ews help expert.

9            menu_item: open my ews help database db.

FIG. 5

Computer listing of Knowledge Management (KM) text file to configure search engine:

1   Q   assert google url search criterion.

2   A   pgm: ewsurlaliasparameters: "www.google.com/search?hl=en&q= google noverbs nopronouns nodeterminers nopreps noandorconjs +"

3      menu_item: assert google url search criterion.

4   Q   assert googsyn url search criterion.

5   A   pgm: ewsurlaliasparameters: "www.google.com/search?hl=en&q= googsyn noverbs nopronouns nodeterminers nopreps noandorconjs syn +"

menu_item: assert googsyn url search criterion.

FIG. 6

Sentences stored in the sentences' table (KM SQL database / repositories) showing synonyms – columns: word1, word2, word3, word4, word5, word6, and word8. Symbol symbolic words shown as word4 and word7

1

| InforID | word1 | word2 | word3 | word4 | word5 | word6 |
|---|---|---|---|---|---|---|
| 67 | getfindlocate opengoshow display | memythe | architectured esign | XXXdia | visiodrawing diagram | memythe |

2

| word7 | word8 | word9 | word10 | word11 | word12 | word13 |
|---|---|---|---|---|---|---|
| ewsienglishworks | applicationprogram | 3.0 | | | | |

3

| word14 | word15 | word16 |
|---|---|---|
| | | |

FIG. 7

Words added to table line 2 at column word10 and word11 will allow other input words to activate this sentence's attachment(s):

1.

| InforID | word1 | word2 | word3 | word4 | word5 | word6 |
|---|---|---|---|---|---|---|
| 67 | getfindlocate opengoshow display | memythe | architectured esign | XXXdia | visiodrawing diagram | memythe |

2.

| word7 | word8 | word9 | word10 | word11 | word12 | word13 |
|---|---|---|---|---|---|---|
| ewsienglishw orks | applicationpr ogram | 3.0 | world | view | | |

3.

| word14 | word15 | word16 |
|---|---|---|
| | | |

FIG. 8

Sentences stored in the solutions' table KMSQL database / repository showing relationships to sentences and attachments' table via columns SolutionID and solnumber:

1.

| SolutionID | solnumber | actions. | sentenceout | SQL | solstatement |
|---|---|---|---|---|---|
| 68 | 67 | architecturea pplication3d ot0: | | | |

2.

| menusentence |
|---|
| show the architecture XXXdia diagram for the ews application 3.0. |

FIG. 9

Single sentence stored in the attachments' table showing relationships to the sentences' and solutions' table:

| AttachmentID | SolutionID | Exe | FileNameOrURL | KMFileName | Extra1 |
|---|---|---|---|---|---|
| 3 | 68 | | "W:\Ews KM\Help\Overall Architecture.doc" | General Purpose KM text file.txt | |

| Extra2 |
|---|
| |

FIG. 10

Enter words similar to words line 2 for the solutions' table words under sentenceout are applied to the application Input and cause a query to a search engine:

1

| SolutionID | solnumber | actions | sentenceout | SQL | solstatement |
|---|---|---|---|---|---|
| 68 | 67 | architectureapplication3dot0; | Google what is the definition of a computer architecture? | | |

2

| menusentence |
|---|
| show the architecture XXXdia diagram for the ews application 3.0. |

FIG. 11

Computer listing (KM) text file. Computer reads Q lines (1,4) to configure software agents:

1    Q    assert ewsagent1 send criterion.

2    A    pgm: ewsagentparameters: "www.someagent1.com/= ewsagent1 sentence_words"

3    menu_item: assert ewsagent1 send criterion.

4    Q    assert ewsagent2 send criterion.

5    A    pgm: ewsagentparameters: "www.someagent2.com/= ewsagent2 sentence_words"

menu_item: assert ewsagent2 send criterion.

Stored Sentences for an English language CMDB (Configuration Management Data Base) shown below:

Stored sentences for an English language CMDB (Configuration Management Data Base). Sorted by exch2000 which occurs in each stored sentence above COUNT = 5:

FIG. 15

File attachment (below) automatically opened from FIG. 14 first sentence when unique letters or words input as in osj350 in FIG. 14:

| Clipboard | | Font | | Alignment | | Number | | Styles | | Cells | | Editing |
|---|---|---|---|---|---|---|---|---|---|---|---|---|
| C4 | | fx | 44-566A-123C | | | | | | | | | |

| | A | B | C | D | E | F | G | H | I |
|---|---|---|---|---|---|---|---|---|---|---|
| 1 | | | | | | | | Operating Systems Configuration Items: | |
| 2 | | | | | | | | | |
| 3 | Item # | Configuration Name ▼ | Serial # ▼ | Service Start Date ▼ | Support Team ▼ | IP ▼ | Change # ▼ | Purpose of Change ▼ | Imp |
| 4 | 1 | w2k3 | 44-566A-123C | 3/25/1999 | WinTel | N/A | RCA 5-2-2004 | Window Patching | |
| 5 | 2 | J350 | Cisco34090B | | Network | NA | RCA 5-27-2005 | Network OS upgrade | |
| 6 | | | | | | | | | |
| 7 | | | | | | | | | |
| 8 | | | | | | | | | |
| 9 | | | | | | | | | |

Inputting Osj350, as shown below, will automatically cause the first sentence in FIG. 14 to fire (execute the sentence's attachment) and brings up the attachment screen shown in FIG. 15:

Enter the word: vehicle and sorted by vehicle, then by synonyms for vehicle (car automobile) and then by the symbol word: transportationvehiclemileage:

KM text repository sentences, sorted by: expert (1st group) - selected by mouse or input as words, word symbols, and synonyms to run / open computer resources:

IMPLEMENTING SYMBOLIC WORD AND SYNONYM ENGLISH LANGUAGE SENTENCE PROCESSING ON COMPUTERS TO IMPROVE USER AUTOMATION

This application is a continuation of U.S. patent application No. 13/136,836, filed Aug. 13, 2011.

BACKGROUND

The background of this invention is classified by number 706—Data Processing with subject matter: Artificial Intelligence. Also, see Natural Language Processing (NLP). Prior work in the same area by the applicant includes: U.S. Pat. Nos. 6,101,490 and 6,269,356.

The said enclosed Patent Application comprises computer software running on computing systems using the Prolog computer language using hundreds of rules to process the English language. Users store English language sentences (their knowledge and link it to other knowledge) in defined databases that are selectable by letters, words, multiple words, symbols (i.e. $) synonyms, synonym sentences, symbol words, and one of more English language sentences. A symbol word is made from a concatenated word created by users and can be composed of letters, words, numbers, and symbols. The symbol word is stored as a word in a stored English language sentence and, as an example, can take the form of:
router1300d001CiscoOSJ350CXX1 is used for exch2000 at flr2011.
Where any letters in the above as in: OSJ350 or any derivation using the letters in sequence will sort other stored sentences such that when entering OSJ350 the sentence below is also shown (both sentences have OSJ350) in the above after mentioned stored sentence.
OSJ350 is the Cisco operating system.
One can see that by looking at the words in the stored sentence, the operating system OSJ350 runs on the Cisco router shown in the first stored sentence above. It also states that the computer router is used for the email exch2000 server and that server is located at floor location: flr2011. To find out where the exch2000 server is located, enter: flr2011 OR flr OR 2011 OR any sequential letters and numbers made up from the letters in the symbol word: flr2011 to get an associated stored sentence with these letters/numbers whose attachment shows a drawing that details where the exch2000 email server is located.

Help Desk systems do not have the known capability to allow users to store English language sentences and linkages with symbol words while also allowing the use of English language synonyms and English language synonym sentences. Often, data cannot be found because there are no symbol words and or they don't use synonyms in conjunction with symbol words. This method can be used on all types of systems to show relationships as expressed by stored English language sentences (knowledge), symbol words, synonyms, and synonym sentences remembering that stored sentences can have one of N other attachments (links) including other letters, words, synonyms, symbol words, and English language sentences. A synonym sentence is a sentence with different words that has the same attachment as one or more other sentences in the same database (preferable) or different database as learned by the computer.

Some examples of knowledge files consisting of the after mentioned methods, software, and computing systems includes but is not limited to (because the English language can describe any knowledge system and people use language to form actions and remember things by words) where the remembered things are words that can be part of a stored English language sentence and the actions are attachments (that can link to other user defined computer resources) and to the stored user English language sentence knowledge.

Typically, search engines and help systems don't let users store their own knowledge or use synonyms or symbol words in stored English language statements but rather may look at several documents (not stored by specific users) performing various rules test to return the data set which, in many cases, is too large to realistically view each item within the returned data set or most often returns data elements that are misleading. It may take several queries to find the right data contained within the search engine data set. However, one can store specific English language sentences that define a context and include synonyms and symbol words in order to improve on the ability to get the correct data on a first attempt. The context of each stored English language sentence can be customized to the needs of the user where as this cannot be automatically set by users who use commercial search engines. However, the context of each stored sentence can have as its attachment a search engine URL to open as specific web page or dynamically since the after mentioned application can compose words with synonyms or synonym sentences to send those words to a search engine. The stored English language words in the after mentioned application are the metadata (a system that uses data to describe other data) for the words stored on the internet. In fact, two or more stored sentences with different words can be attached to the same URL and these stored English language sentences are defined as synonym sentences. So where one user may think of words in one stored synonym sentence, another user may think of different words found in other stored synonym sentences to get to the same data. Each word or group of words for each stored sentence will connect to the same URL and will cause the after mentioned application to open the specific web page and if the set of input words is unique to the store sentences attached to the URL, the URL will automatically open when those letters/words are entered at the input of the said application. The said application serves as a massive integrator of knowledge that includes data on LANs, WANs, and other computing devices where an attachment is a link to any computer resource comprising computer programs URLs, and other English language sentences.

All processes within the said application are done by using English language sentences to switch to a different SQL database, to open a different text files (text files are used to open SQL databases), to open URLs, to execute computer programs, to run SQL queries on external SQL databases, to send English language text and symbols via agent software to other computers running the said application on the Internet, to link as attachments to other English language sentences by whole English language sentences, words, letters or multiples of each ending with a period or question mark character as by example: gmail. (car, automobile, vehicle as a synonym words). flr. Google what is the time in London, England? agentBill get me a map of local gas prices. Where each of the after mentioned letters, words, synonyms, symbol words, search engine sentences or agent software sentences can be composed and input to the said application or stored in a text file or SQL database and input to the said application as an attachment.

The said application is designed to use methods that substantially improve computer human language automation, to let users store their own knowledge using letters, words, synonyms and symbols words with English language sentences, to integrate knowledge from the Internet and user defined knowledge or other sources of knowledge in order to reduce the number of steps to get knowledge or improve on the quality of knowledge retrieved by users.

Materials used as references in the design of the after mentioned software application:

Prolog Programming in Depth—Michael A. Covington, Donald Nute, and Andre Vellino ISBN 0-673-18659-8

A web site in England using WIN-PROLOG

Related links and web page URLs and R&D related to U.S. Pat. Nos. 6,101,490 and 6,269,356.

SUMMARY OF DISCLOSURE

A system of software using AI rule based methods to process the English language to let users store custom knowledge with additional methods to retrieve stored knowledge using words, synonyms, synonyms sentences and symbol words. Additional methods allow users to link stored English language sentences to user customizable attachments either from user input or input that comes from attachments that, in themselves, can be letters, words, multiple words, a sentence, multiple sentences, search engine queries in English language format including synonyms and synonym sentences, and software agent sentences sent to remote or local computers running the said computer application.

Adding synonym, symbol word, and synonym processing while feeding attachments back to the said application input depending on the context of the words in the sentence helps to integrate knowledge and substantially reduce the number steps to get integrated and quality knowledge to users from the after mentioned application. The after mentioned application gives user five dimensions of data including: 1) the context of stored words in the stored English language sentence, 2) symbol word processing that lets users store multiple words and symbols in a single concatenated word in a stored English language sentence—once stored, user can query all stored sentences to find words and symbols in the symbol word and the symbol word components can show related words in other stored sentences, 3) the context of words shown with other stored sentences with or without symbol words, 4) the attachment of stored sentences and their linkages to other stored sentence or computer resources, 5) the relationship of a stored sentence and the ability to query search engines with synonyms.

Once these stored English language sentences (user knowledge) are related and sorted such that related groups of sentences can be displayed to users, it becomes possible to select the relationship from the best user context (what the user needs) that would not be otherwise possible if symbol words, synonyms, and synonym sentences were not used.

BRIEF DESCRIPTION OF DRAWINGS

FIG. 2—Sentences stored in KM text repository to open an electronic dictionary

FIG. 3—Sentences stored in the KM text repository to open the said application help expert—a KM SQL repository/database that helps users with the said application.

FIG. 4—Part of FIG. 3 that further uses English language sentence to open the help expert KM SQL repository/database and configures search engines with synonym and non synonym words.

FIG. 5—continuation of FIG. 4 with a focus on synonym and non synonym words processing sent to search engines.

FIG. 6—Shows storage of regular English language words, symbol words, and synonyms stored in the sentences' table for the currently open KM SQL repository/database.

FIG. 7—Same as FIG. 6 but shows the addition of two words to the sentences' table namely: world and view.

FIG. 8—Part of the KM SQL repository/database solutions' table which, in this example, is related to FIG. 6, FIG. 7 whereby in FIG. 8 column menusentence match at least some of the words in its corresponding sentences' table as shown in FIG. 6 and FIG. 7. Prepositions in FIG. 8 in column menusentence i.e. (for) is not replicated in the sentences' table for FIG. 6 and FIG. 7.

FIG. 9—shows the file attachment under column FileNameOrURL for the sentences stored in FIG. 6, FIG. 7, and FIG. 8.

FIG. 10 is the same as FIG. 8, but FIG. 10 has a stored sentence under the column sentenceout and in addition to the input sentence that says: (show the architecture XXXdia diagram for the ews application 3.0.)—that opens the file in FIG. 9 under column: FileNameOrURL, FIG. 10 also sends a stored sentence to Google namely: (Google what is the definition of a computed architecture?).

FIG. 11—show sentences used to send a remote software agent a string of words where by the remote software agent is running the said application.

FIG. 15 is an attachment connected to the sentence symbol word: Osj350—see first sentence in FIG. 14.

DETAILED DESCRIPTION

This Non provisional US Utility Patent application is for a computer application (known as the (i)EnglishWork (Ews) or said Application). Its primary purpose is to store user knowledge in the form of English language statements (sentences) (see Reference 12 item A—end of this detailed description) and then to improve retrieval of that knowledge by using input (words, symbol words and synonyms). This is done using the said application together with computers and related devices. A portion of the disclosure of this patent document contains material which is subject to (copyright or mask work) protection. The (copyright or mask work) owner has no objection to the facsimile reproduction by anyone of the patent document or the patent disclosure, as it appears in the Patent and Trademark Office patent file of records, but otherwise reserves all (copyright or mask work) rights whatsoever. The said application makes computers learn by storing English language sentences using context-free phrase structure rules (see Reference 1—end of this detailed description) where: S→NP VP using the computer prolog programming language as detailed in Reference 2—end of this detailed description).

In essence, the said application takes knowledge, lets users store it as statements (sentences) in the computer with interconnection to attachments and other statements and then allows any user, at some later point in time, to recapture that knowledge to improve labor productivity. A key component of the said application is to allow users to query the stored knowledge using partial words, words, statements, symbol words, and synonyms to get back the stored knowledge that may otherwise go undetected without the statement memory architecture and word processes.

Figure 1:
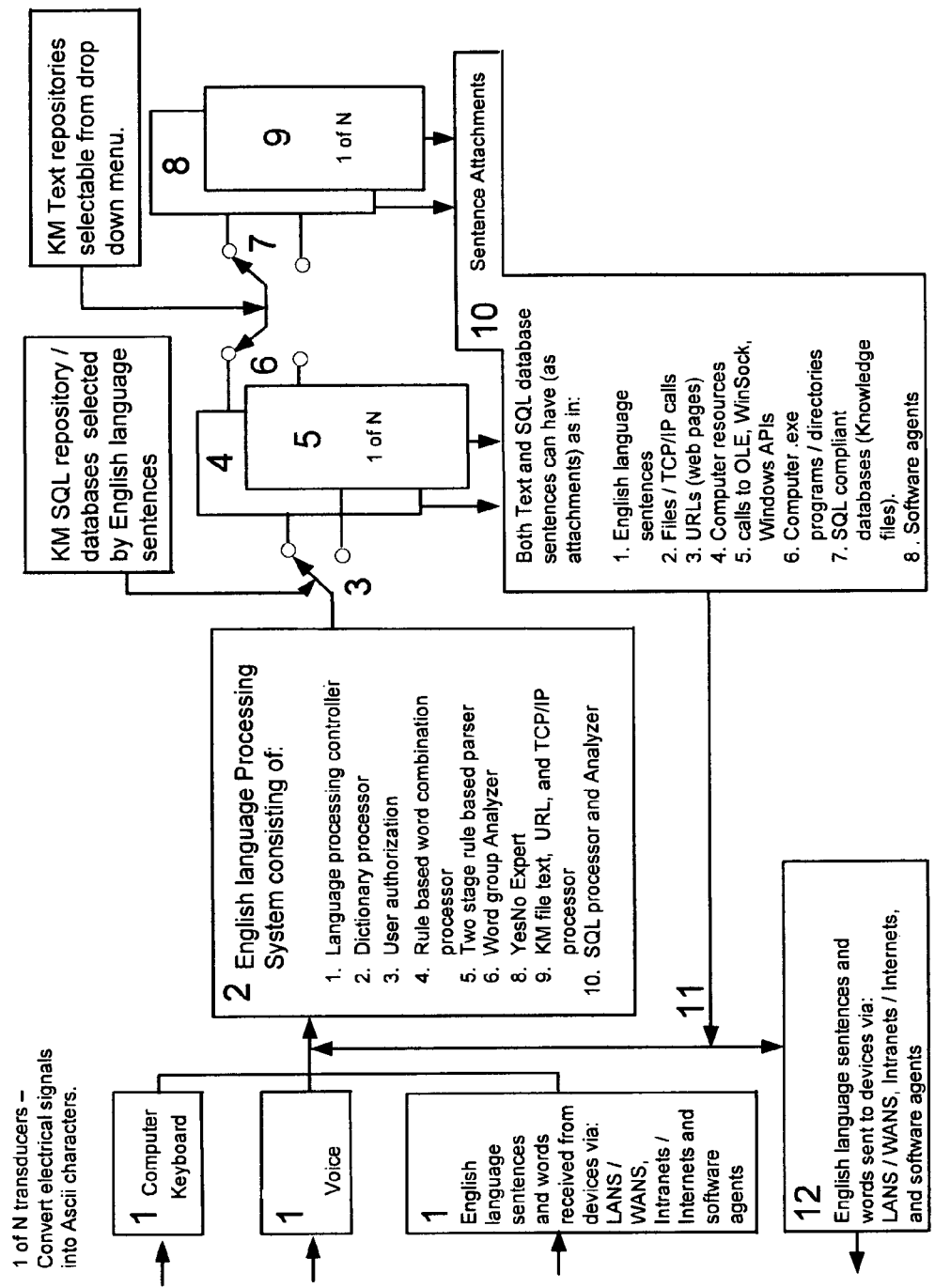
FIG. 1—Overall software architecture of said application

This architecture is represented in FIG. 1. English language statements (sentences) are entered at point 1 for keyboard, voice, and other computer input. At point 2, word phrases are identified by rules to eliminate certain words and to determine downstream processing methods where the input reaches locations/points/rectangles 4 and 5 in FIG. 1—see Reference 8—end of this detailed description for a listing of all figures for this and any other figures). Points (rectangles 4 and 5) in FIG. 1 represent 1 of N selectable KM SQL repositories/databases which are selected by English language sentences stored and near matched to input words in the KM (Knowledge Management) text repository (see Reference 11—end of this detailed description)—FIG. 1 rectangles 8 and 9. Caution—the KM text repositories in FIG. 1 points 8 and 9 actually select the KM SQL repository/databases so that any sentences from the input FIG. 1 point 1 thereafter are applied to the KM SQL repository/database at points 4 and 5. If the input statements (sentences) fail to find a near match to sentences stored in the KM SQL repository/database, they are then directed to the KM text repository to see if there is a near match to any sentences (including ones that will cause the said application to switch to a new KM SQL repository/database). If the input sentence fails (in FIG. 1 location 1 or 11) to find a near match to either the KM SQL repository/database or the KM text repository then a test is made of the input statement (sentence)—(see Reference 12 item A—end of this detailed description) to see if it's a specially formatted sentence that was set up when the said application was given its start up sentence. In essence, the start up sentences tells the said application to read stored sentences in the KM text repository (see Reference 12 item A and Reference 11—end of this detailed description). These stored sentences perform the opening and selecting of the KM SQL repository/database (see Reference 11—end of this detailed description) and the configuration of the so-called search engine sentences, and the initialization of other functions within the said application when the said application reads these sentences that are stored in the KM text repository. It is important to consider that statements (sentences) that are stored in either the KM text repository or the KM SQL repository/database and near matched to input sentences that are connected to attachments by the user when those users store a statement (sentence) in either the KM text repository or the KM SQL repository where attachment types are defined in Reference 6—end of this detailed description. The exception is that search engine queries from the said application are not stored as English language sentences, but are created on the fly by the user's words that can be modified by the configuration data stored in the KM text repository. The configuration for the content of words sent to search engines is done by a group of stored sentences that are read and acted on by the said application and attached to the start up sentence. Stored English language sentences can also be attached to URLs that should not be confused with non-stored statements (sentences) that are created on the fly when users input English language sentences that are to be sent to search engines like Google.

The said application is composed of (see FIG. 1): a computer input, an English language Processing Systems (with sub-systems) and Knowledge Management (KM) text repositories (that can be 1 of N text repositories) for which the said application uses the text databases (KM text repository) to connect to (1 of N KM SQL database/repositories). The KM text repository performs two important functions that include:

1) It carries out common tasks when users input English language statement (sentences) that would not be stored in the KM SQL repository/databases and 2) It provides a connection to open selected KM SQL repository/databases when users input English language statements (sentences).

The said application is capable of using the said KM text repository to switch between (using English language statements (sentences)) from the input FIG. 1 location 11) to FIG. 1 location 4 and 5 of 1 of N KM SQL databases/repositories and, in turn, the current said KM SQL repository/database is capable of sending an English language statement (sentence) to the said KM text repository causing the KM text repository to switch to a different said KM SQL repository/databases.

Switching between KM SQL repositories/databases can be initiated from stored English language statements (sentences) in the KM text repository (FIG. 1 location 8 and 9 to location 10 to location 11 to location 2) or from input from a user at FIG. 1 location 1 to location 8 and 9. It should be noted that if an input statement (sentence) cannot find a near match to stored sentences in FIG. 1 locations 4 and 5, those input statements (sentences) will bypass FIG. 1 location 4 and 5 and go to FIG. 1 location 8 and 9.

A said repository (KM text file repository or KM SQL database/repository) or other such repository that can send an English language statements (sentences) to the said application's input (FIG. 1 location 1 or FIG. 1 location 11) can cause the said application to switch to different repositories using words in statements (sentences) from either the repositories themselves or from the said application's input. In each case, the said application activates an attachment or attachments stored with the English language statement (sentence) in the KM text repositories or the KM SQL repository/databases.

When an input English language statement (sentence) is sent to the said application's input by a person or machine (FIG. 1 at point 1), the said application checks to see if there is a near match of the input words to similar (because of symbol words or synonym words) and words stored in the application's said repositories. Partial or full words or statement (sentence) (see Reference 9—end of this specification) eventually selects a statement (sentence) stored in the KM text file repository and or the SQL KM database/repository which ever has the best near match to the input statement (sentence) which then selects an attachment in the KM text file repository or the KM SQL database/repository. Attachments can include—see Reference 6 end of specification.

For URL searches not using the applications search engine synonym feature, the saved learned statements (sentences) attachments can be a mixture of URLs and other application attachments. These attachments are activated when non sentence inputs near match words (because of symbol words or synonyms) in the stored displayed menu sentences (either KM text menu repository or the KM SQL repository/database) or when input sentences finds a closely matched sentence in either the KM text repository of the KM SQL repository/database. In the case that the input statement (sentence)

goes directly to a search engine (there is no near matching of input words to either the KM text repository or KM SQL repositories/databases) but instead the English language statement (sentence) is modified via configuration parameters in the KM text repository to remove certain words or substitute synonym words for input words before those words go to the search engine. The application input is eventually formatted to send the user English language statement (sentence) to the search engine via the sentence format: XXX (search engine statement (sentence)) as in: (Google what is the time in London England?) using the path defined in (FIG. 1 location 1, 2, 3, 4, 6, 7, 8, 10, and 12).

Note, that input statements (sentences) can spawn new statements (sentences) as attachments (from the KM SQL repository/database see FIG. 10 line 1 column (sentenceout) for the KM SQL repository/database attached sentences—(Google what is the definition of a computer architecture?) or from the KM text repository see FIG. 4 line 5—(after the keyword sentences: connect to my ews help expert. Identify the tables for my ews help expert. Assert google url search criterion. Assert googsyn url search criterion.) for KM text repository attached sentences and fed back to the input (FIG. 1 location 1) causing those statements (sentences) to connect to their attachments which could cause other output from the KM SQL repository/database FIG. 1 location 4 and 5 or from the KM text repository FIG. 1 location 8 and 9 to location 11 or 12.

The process to open a KM SQL repository/database, configure a search engine or software agent, and near match a stored sentence to an input sentence to activate its attachments is as follows:

In this case, the user would like the said application to open the said application's help KM SQL repository/database. This repository/database is a collection of stored English language sentences that describe the functions of the said application, define how to set up the KM SQL repository/databases, define how to format the KM text repositories, define what a user may experience when using the said application, information to tell uses how to set screen sizes, and related information to effectively use the said application. In order to better understand the methods by which the said application processes input text sent to the KM text repository it will be necessary to refer to FIG. 2.

When the input words match some of the words (referred to as a near match) in the line 1 (the Q line) of the KM text repository FIG. 1 location 8, the said application reads line 2 or the A line where is sees: pgm: webdictionary. It should be also noted that the attachment: webdictionary: opens an electronic dictionary on the user's desktop and this is done by the user when users enter the input sentence for the first time in which case the user made up word: webdictionary: is attached to the actual computer program the runs the electronic dictionary by the computer.

It should be noted that many different input words could be used to match the words in line 1 including but not limited to the following:
1) open my edic. where edic is defined as a symbol word
2) get my electronic dictionary.
3) please open my dictionary application.

Other input word combination can be used and the more words that are added to the Q line or line 1 will increase the number of input sentences that can be used to match those words in the Q line causing the attachment (the electronic dictionary) to be run on the computer. The last line beginning with menu_item will display this statement (sentence) in the KM text repository menu systems shown in FIG. 18-*second sentence from the bottom*. Note that each word in the menu\_item sentence must match some of the words in the Q line or line 1 in FIG. 2. The user has two ways to activate the attachment of this sentence. The first is by entering sentence combinations and permutations partially listed in items 1-3 above and the second is by selecting the KM text repository menu item second statement (sentence) from the bottom in FIG. 18. Note that the Q line or line 1 in FIG. 2 contains both symbol words and synonyms words where the symbol word is defined as: edic and the synonym words are: open and get as defined by the user when the statement (sentence) was set up (stored) in the KM text repository as shown in FIG. 2 lines 1, 2, and 3.

As stated, one of the functions of storing statements (sentences) in the KM text repository is to be able to match those stored sentences with input sentences in order to activate that stored sentence's attachments.

Note, a KM text repository can have thousands of stored statement (sentences) and access to those stored statements (sentences) is done by inputting words to FIG. 1 location 1 or from sentences stored in the same KM text repository or KM SQL repository/database that are fed back to the input via FIG. 1 locations 4, 5, or 8, 9 to 10 as statement (sentence) attachments to FIG. 1 to location 11 to location 2 or if the attachment(s) is going to a WAN over the Internet as a URL to FIG. 1 to location 11 to Location 12.

The statements (sentences) stored in the KM text repository can be interconnected to other sentences in the same KM text repository by entering those sentences after the keyword: sentences: in the KM text repository shown in FIG. 4 line 5. Opening the application's said help database (KM SQL repository/database) can be done automatically when the said application starts up by clicking the said application's icon on the desktop which then near matches the start up sentence stored in the KM text repository—see FIG. 4 line 6 which near matches to the Q line in FIG. 4 line 4 which then calls its corresponding A line in FIG. 4 line 5.

To store a start up sentence (used by the KM text repository only, a user would do: <space> rmt (short for the word remote). At this point the said application asks the user to enter a start up sentence. In this case and in FIG. 4 line 6, the user would enter: get my internal ews help expert. When the said application is started up (by clicking on the said application's desktop icon) and after the storage of the start up sentence: (get my internal ews help expert.) the said application would then match these words with some of the words in FIG. 4 line 4—the actual start up sentence words as shown in FIG. 4 line 6.

Next, the said application goes to FIG. 4 line 5 because when the said application finds its Q line, it knows it should then go to the corresponding A line (right below the Q line) and do what it is told to do when it reads the A line keyword: sentences. The said application then reads all the statements (sentences) after the keyword: sentences: and places all these sentences at the input—FIG. 1 location 1 from FIG. 1 location 8. The first sentence that is read is: (connect to my ews help expert.). This sentence and more importantly its attachment is located in FIG. 3 line 3 which activates the attachment in FIG. 3 line 4. This tells the said application to make an ODBC connection to the KM SQL repository/database help expert.

Continuing on in FIG. 4 line 5, the said application has since connected to the KM SQL repository/database and then reads the next sentence to identify the tables in the KM SQL repository/database where it will eventually be used to read and store sentences input by the user. That sentence is: (Identify the tables for my ews help expert.) and this sentence with its attachments are located in FIG. 3 lines 10 and whose attachment is in FIG. 4 line 1. Next, the third sentence to be processed in FIG. 4 line 5 is: (Assert google url search criterion.).

The said application then finds this sentence in the KM text repository that is located in FIG. 5 line 1 and its attachment is in FIG. 5 line 2. The attachment configures the parameters for an on the fly search engine sentence that will be sent to Google eliminating certain words from going to the search engine (Google) on the Internet. Again, going back to FIG. 4 line 5 and reading the sentence: (Assert googsyn url search criterion.) and finding its sentence in FIG. 5 line 4 and its attachment in FIG. 5 line 5 that defines the words that will be sent to Google after they have been modified by the parameters in the attachment of FIG. 5 line 5 which is being called by the sentence in FIG. 5 line 4. Note, that there after an input like: (googsyn show me a picture of a red vehicle.)—will actually change the words sent to Google, using synonym substitution by changing vehicle for car resulting in the following words being sent to Google namely: http://www.google.com/search?hl=en&q=picture+red+car Here, the said application eliminated some words to Google, but it also changed the word vehicle using the synonym: car and replacing it in the new query to Google. Note, that FIG. 5 line 5 is used to configure the said application similar to FIG. 5 line 2 where in both cases: "www.google.com/search?hl=en&q=google" is sent to the Google search engine plus the words using the configuration parameters (noverbs—eliminates verbs sent to Google and similarly eliminates: pronouns (nopronouns); determiners (nodeterminers—the, a, an); prepositions (nopreps); and no conjunctions (noandorconjs—and etc.). Also, in FIG. 5 line 5 where: syn means to use synonyms and finely + means to separate the remaining English language words sent to Google with a + sign (a delimiter) resulting (repeated from above): (Google: http://www.google.com/search?hl=en&q=picture+red+car).

Figure 18:
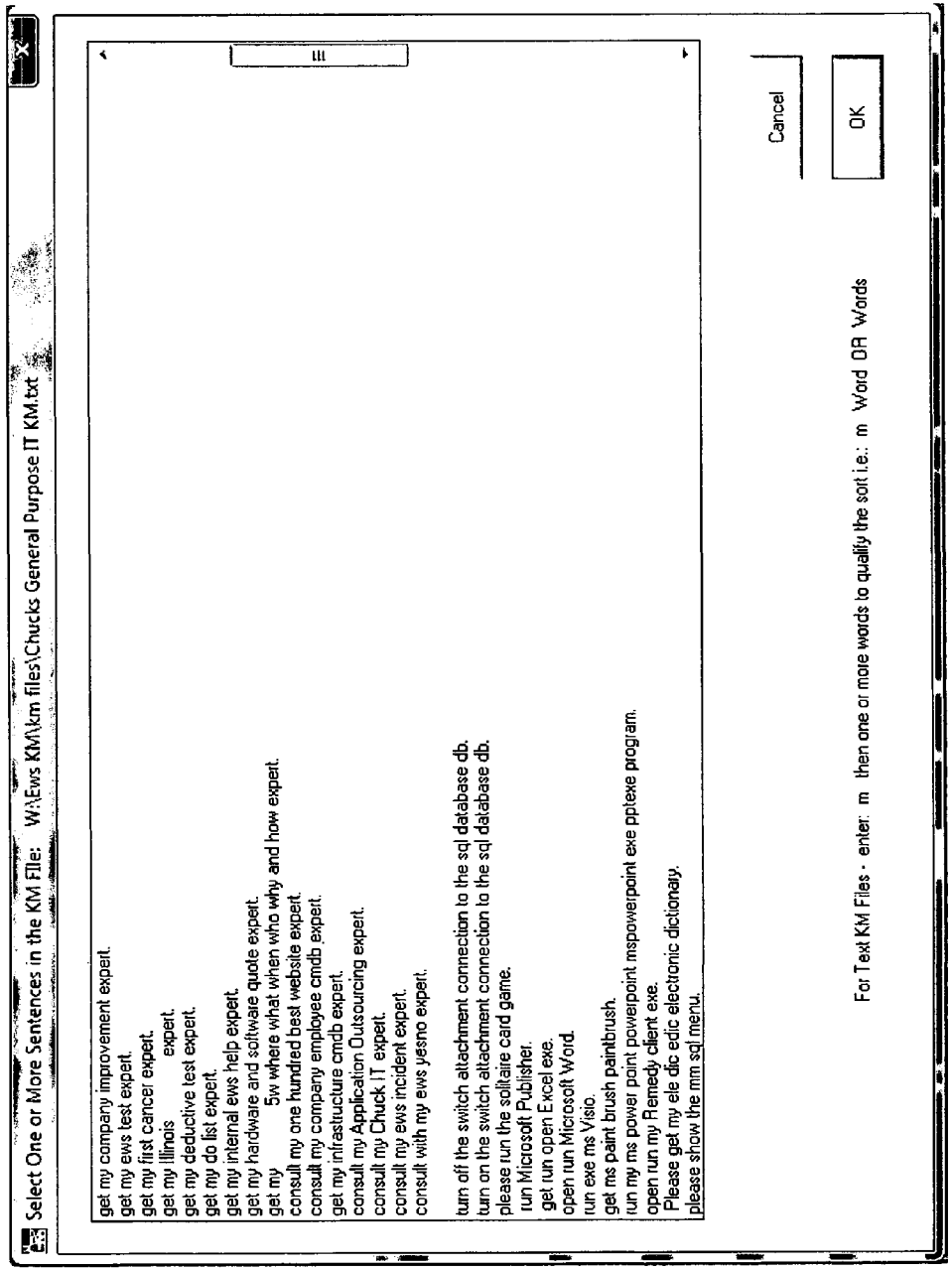
FIG. 18 is a sorting of the KM text repository by the input word (<space> m expert). Each expert opens a KM SQL repository/database.

The memory architecture from FIG. 1 is based on the text memory (the KM text repository (a text file) that is called the KM text repository) and can be a selected KM text repository (1 of N) from the computer's drop down menu box) which in turn contains English language statements (sentences) used by the said application to open N number of KM SQL repository/databases and to perform other said application functions when input statements (sentences) near match sentences stored in the Q line with associated A lines (attachments) and menu_item: lines used to show what's stored in the KM text repository in the corresponding KM text repository drop down menu i.e.: by FIG. 18.

In the learn mode (<space> save—then input a statement (sentence)) to be stored in the KM SQL repository/database. The newly saved (stored) statement (sentence) is recalled whereby the user selects an appropriate attachment from a choice of menu items or enters a URL as an attachment. To save sentences in the KM text repository, users must follow the format as shown in FIG. 2 and use defined attachment keywords after the keyword: pgm: followed by the attachment word as in: webdictionary: Also, users must enter the menu_item: The sentence after menu_item: has to match some of the words in the corresponding Q line (FIG. 2 line 1)). Note, that the difference in the words after menu_item: and the words in FIG. 2 line 1 (Q line) are extra words that can be put in this Q line to allow users to enter input sentence variations (other words), symbol words, and synonyms. The menu_item: sentence is used to display the stored KM text repository sentence in a user drop down menu (FIG. 18 second sentence from the bottom) and when it is selected by the mouse it will be placed at the input FIG. 1 location 1 where it will search the KM text repository looking for the best matching Q line—in this case line 1 in FIG. 2.

Thereafter, English language sentences are typed into the computer or otherwise made available to the said application input (FIG. 1 at location 1) via machine, computer or other devices on or off a computer network so that these English language statements (sentences) are stored in the computer's data repositories with user selected attachment(s) where they can be later near matched with input statements (sentences), symbol words, and synonyms where symbol words like: (see FIG. 12 first line where router1300d001CiscoOSJ350CXX1, exch2000, and flr2010 are symbol words) and where synonyms are found in the KM SQL repository/database by entering the word: car at the said application input FIG. 1 location 1 resulting in: (FIG. 17 first block of sentences above COUNT=1 and COUNT=7) where a synonym is defined as two words that can be interchanged in a context and are said to be synonymous relative to that context (see Reference 3—end of this detailed description) and where car (as an example) is a synonym for automobile and vehicle, and where the said application stores the synonym (carautomobilevehicle) for every occurrence of the words (car, automobile, vehicle) for the input sentence to be stored in the sentences' table (and not in the solutions' table as is done with symbol words) for the said application data in the KM SQL repository/database and where a symbol word for car (in addition to the synonym word for car, automobile, and vehicle (carautomobilevehicle)) could be added to the sentence words to be stored in the KM SQL repository/database and where, for example, a symbol word can be included with the other words for the stored sentence (FIG. 17 first stored statement (sentence) as in: (transportationlandtravel) which would be stored in both the sentences and solutions' tables (unlike synonyms which are stored in the sentences' table only and not in the solutions' table) using the said application's input defined as (see Reference 9—end of this detailed description) to help users recall knowledge to improve labor productivity or other such needs to recall knowledge using symbol words and synonyms in stored sentences to activate machines or computer processes through the user defined statement (sentence) attachments.

And where by example (see FIG. 17) and the stored sentence: (My car transportationlandtravel data is referenced in the vehicle crib sheet.) first line above COUNT=1) and where transportationlandtravel is a symbol word stored with other words for a statement (sentence) stored in the KM text repository and the KM SQL repository database (in this case, the after mentioned statement (sentence) is stored in the KM SQL repository database) and single word inputs like automobile (synonyms matches car and vehicle in the after mentioned sentence in FIG. 17) or the input letters: land where land is part of the symbol word: (transportationlandtravel)) in FIG. 17 first stored sentence or this sentence could have been stored in the KM text repository as shown by example in FIG. 18 using, by example, the method show in FIG. 2.

The said application's stored statements (sentences) are not meant to be readily available to internet search engines since they would often generally contain personal or business proprietary information. In addition, the said computer application works to make an English language computing system such that the said application responds to English language statements (sentences) from the said application's input from: a person (typing in text); machine; or said devices (sending text) on or off a computer network. Moreover, that the said application opens KM SQL repositories/databases using English language statements (sentences) stored in the KM text repositories. The said application improves past methods to get information by using synonym and symbol word, multi-English language statement (sentence) input, and repositories (text and SQL) that communicate in the English language with one another via the said application's internal computer processes and data repositories using the English language.

The said application's attachments are defined in Reference 6—end of this detailed description. If the input statement (sentence) is a near match to the stored sentence in either the KM text repository or the KM SQL repository/database, the said application activates the attachment(s) of the said stored near matching English language statement (sentence) to the input and processes those attachment(s). The said application's attachments can also include internal said application statements (sentences) such that entering the input statement (sentence) at FIG. 1 location 1 or from location 11 such as: (Show me the ews application attachments.) will cause the said application to near match a stored sentence from the KM text repository and give a listing of all attachments for the current KM text file repository and not for the KM SQL database/repository. This particular statement (sentence) is stored in the KM text repository (with symbol words or synonyms) and would be a common statement (sentence) to all other statements (sentences) stored in any KM SQL database/repository. All statement (sentences) to open any (currently open/active) KM SQL repositories/databases are contained in the KM text repository. Other said application internal statements (sentences) are stored in the current KM file repository that aid users in the said application's functionality.

When the user of the said application stores an English language statement (sentence) in the said computer application's KM SQL database/repository, the said application automatically stores the symbol words and synonyms of the said application input words comprised of an English language statements (sentences) that will be stored in the current open said application KM SQL database/repository.

The KM SQL database/repositories are made of up (at a minimum) of four SQL tables. The sentences' table stores rows of input statements (sentences) words including symbol words and synonym words for the input storage of user stated English language statement (sentences)—see FIG. 7 lines 1, 2, and 3. Words in the sentences' table are also stored in lower case and in singular word format without punctuation. The solutions' table stores the user input English language statements (sentences) without modification of input words (see FIG. 8 line 2 and compare to FIG. 7 lines 1,2, and 3).

In the KM text file repository, text English language statements (sentences) symbol words and synonyms are manually stored by the user. In the SQL repositories/databases, the solutions' table (see FIG. 8) statements (sentences) (as input by the user) are the metadata for the words stored in the sentences' table. By this, it is meant that the metadata in the solutions' table (i.e.: FIG. 8 line 2) works to match symbol words and synonyms and other words that are included in the sentences' table (see FIG. 6 and FIG. 7) and are not included in the solutions' table (see FIG. 8 line 2)—the solutions' table does not, in general, contain synonyms but does contain user defined symbol words—when users enter a single word, at the input FIG. 1 location 1 like car, for example, the said application will then display every statement (sentence) in the said application's drop down KM SQL repository/database menu system stored from the solutions' table in the said application KM SQL database/repository with the words: car, automobile, and vehicle—see FIG. 17 as an example between COUNT=1 and COUNT=7 where the words car, automobile, and vehicle are shown in the stored sentences. Not all words stored in the KM SQL database/repository sentence's table contain synonyms but users can manually insert such words and or symbol words and other words as deemed necessary in the KM SQL repository/database sentences' table.

Note, the manually stored synonyms may not be concatenated but symbol words can be concatenated by users—see Reference 4—end of this detailed description. The attachments' table stores the statement (sentences) attachments as defined by the user. When attachments are assigned to stored sentences, either in the KM text repository or the KM SQL repository/database, users will recall the stored sentence for the first time which will cause the said application to display a menu of attachments asking the user to select a particular attachment (computer resource—see Reference 6—end of this detailed description) for either the KM text file repository or KM SQL database/repositories.

Each repository (text or SQL) can have N number of attachments. Attachments in the KM SQL repositories are stored in the attachments table for that current open KM SQL database/repository and attachments for the currently active KM text repository are stored after the keyword: (pgm:) in an internal attachment's database. Other keywords exist for the KM text repositories to further expand the said application's functionality.

Each repository is processed for near matching input statements (sentences) from the said application's input (FIG. 1 location 1) or from either the KM text repository or KM SQL database/repository since the KM text repository and KM SQL repository/database data is fed back (FIG. 1 location 4 and 5 or 8 and 9 to location 10 to 11 to 2) to the said application's input if the statement (sentence) attachment is one or more English language sentences.

If the input is an English language statement (sentence) (S→NP VP), it goes first to the SQL KM repository (bypassing the SLQ menu system (displays words in stored statements (sentences) including symbol words and synonyms)) and looks for a near match in the currently open KM SQL database/repository in the sentences' table. If a near match is found, the said application executes the statement (sentence's) attachments—If one of the attachments is an English language statement (sentence)—could be multiple English language sentences, for example, the statement (sentence) attachment is sent to the said application's input in FIG. 1 from location 11 to location 2 for further processing. If no near match is found in the KM SQL database/repository, the said input statement (sentence) is directed to the KM text repository where it also looks for a near match to the input statement (sentence) in the KM text repository. If no near match is found, the said statement (sentence) would be sent to the Internet search engine provided the statement (sentence) was configured with a search engine name. Specified search engine inputs must start with the search engine name defined here as XXX followed by the input statement (sentence) as in: (XXX what time is it in London England?).

The format of the query words can be automatically changed with the words that make up XXX. In this case, the XXX format tells the said application to make the query: (XXX what time is it in London England?) to what+time+london+England so it can be sent to the specified search engine named as XXX.

Note, that URL or said application's attachments come from attachments whereas URL data to be processed by search engines are processed by the function using the format XXX (statement (sentence)) specification—see FIG. 5 lines 2 and 5. Likewise, if synonyms were to be used in an Internet search, the input statement (sentence) would be: XXXsyn show me a picture of a red car; or XXXsyn show me a picture of a red automobile; or XXXsyn show me a picture of a red vehicle. In each case, the search engine returns the same ordered set of pages for a red car whereas without synonym processing the search results set are different for each search query i.e.: XXX show me a picture of a red car; or XXX show me a picture of a red automobile; or XXX show me a picture of a red vehicle. Note the difference in the search engine format specification: XXX (statement (sentence)) vs. XXX-syn (statement (sentence)). The search engine format specification is stored in the KM text file repository shown in FIG. 5 line 1 with attachments in line 2 and line 4 with attachments in line 5. Note, that a KM text repository provides common functions and configurations to ongoing input statement (sentences) usually initiated with a start up sentence as could be used in FIG. 4 line 6 which calls FIG. 4 line 4 which then activates the attachments in FIG. 4 line 5 as previously described. The format specification also tells the said application to remove certain words that are not nouns as used in the statement (sentence) as determined by FIG. 1 at location 2.

If the input is not an English language statement (sentence) (is not S→NP VP as determined by FIG. 1 in section 21, the input automatically activates the KM SQL database/repository menu system and displays stored statements (sentences) as follows: (see Reference 10—end of this detailed description). For the current open KM SQL repository/database, each displayed group in the KM SQL repository/database drop down menu system is separated with a space and a statement (sentence) count for that group of displayed statements (sentences). Showing stored statements (sentences) (FIG. 13, FIG. 14, and FIG. 17) in the KM SQL database/repository is shown from the solutions' table. If no matching letters are found for the input (which can be multiple words and letters) then the said application displays all the stored KM SQL repository/database statements (sentences)—see FIG. 12 as an example. With no near match to input words in the currently open KM SQL database/repository, users can then click on the SQL screen button called (see FIG. 12—(Input selected Sentences from Text (KM) File) for the KM text repository which will then show all the KM text repository statements (sentences) near matching the input (FIG. 1 location 1). If there are matching letters or words those stored statements (sentences) will be likewise sorted by groups like the KM SQL database/repository sorting—see FIG. 18.

Figure 14:
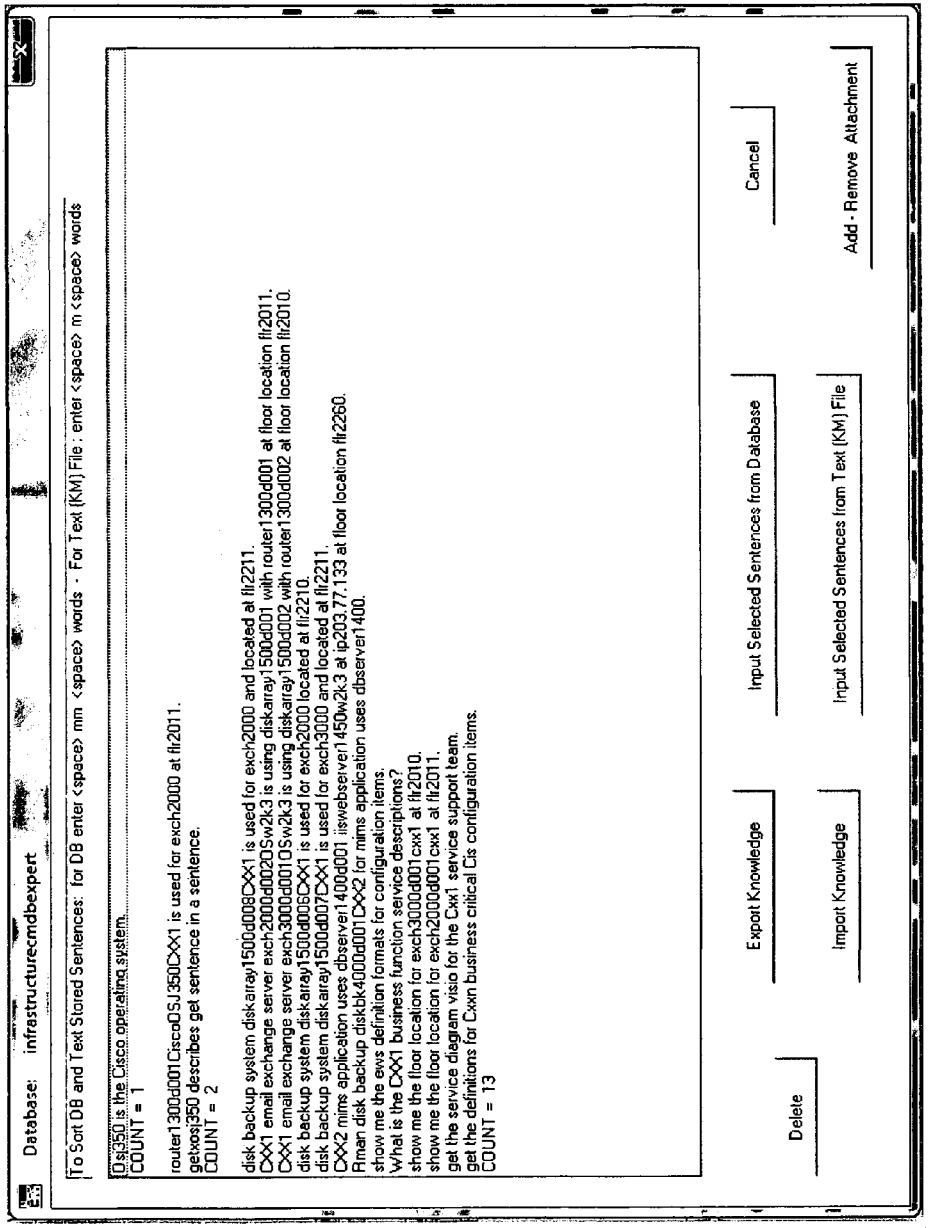
FIG. 14 is a sorting by the input: Osj350 in FIG. 12.

A special case exists when entering words that are not a sentence which will cause the KM SQL repository/database to display its stored statements (sentences) or the KM text repository to display its stored statements (sentences) such that if group 1 (refer to Reference 10—end of this detailed description) has a single statement (sentence), the said application will automatically open the attachment(s) for that stored sentence—see FIG. 14 first stored statement (sentence) above COUNT=1. In actuality, when a single word or words are found to be associated with one stored sentence, the said application identifies that store sentence and puts it at the input of FIG. 1 location 11 and on into the said application (FIG. 1 location 2) for processing. For example, entering: gmail (if these letters (words) are the only stored letters (symbol words) in one stored statement (sentence) then the said application will get that stored sentence, place it at the input (FIG. 1 location 11 to location 2) and go to the associated ULR and the associated email account. Entering: gmail. word 2007. (each word in the input group of words must have a period between word groups except for the last word group—word 2007) and if each input group of letters and words is unique to one stored statement (sentence) respectively stored in the KM SQL repository/database, then the said application will open the user's email account followed by opening the word 2007 word processor application. Further, if there was only one stored statement (sentence) containing the word car and the user entered the word: automobile at the said application input (FIG. 1) location 1, the said application would automatically open the application's car statement (sentence) attachment at FIG. 1 location 8 or 9 and 10. Likewise, if statements (sentences) were input as in: (open my gmail account. get my 2007 word processor application.)—two input statements (sentences) for the said application, the said application would process these statements (sentences) from the KM SQL database/repository sentences' table (has symbol words and synonyms) and not from the KM SQL database/repository solutions' table that provides drop down data on stored statement (sentence) used to match input words. In other words, a true input sentence is processed against the sentences' table and does not use the solutions' table, which is used to sort non-sentence input for the user.

An input sentence never causes the KM SQL database/repository or the KM text repository to display their drop down menus. The drop down menu for the KM SQL repository/database is displayed when the input is not an English language sentence (only verbs or nouns but not both since both would define an English language sentence: S→NP VP) and will the show stored sentence in either the KM text repository or the KM SQL repository/database drop down menus which ever repository has the stored sentence. If the input is not an English language sentence and the input words are either verbs or nouns and the input letters, words, symbol words, and synonyms are unique to one stored statement (sentence) then the input near matching the stored sentences (because partial letters matching of symbol words or synonyms) will cause its attachments to fire or become activated by the said application using the said applications architecture FIG. 1 location 2 and the corresponding English language Processing System.

Although, similar types of computer applications have been developed in the past, the novel components (defined symbol words and synonyms) of the said computer application significantly improve the computer's ability to get past user-stored knowledge (sentences) using these methods. These mechanisms improved retrieval of stored English language statements (sentences) (knowledge stored by users) and their attachments. The said application forces users to store information in English language sentence format in order to help ensure complete human thoughts are stored in the said application and corresponding device/computing system. This improves retrieval and works to make sure that the context of related words in an English language sentence and by its very formation, helps to make sure that stored words in each sentence has some relevance to one another. The said computer application makes sure that English language statement (sentence) stored in the said repositories are, in fact, English language sentences. Note, that once these statements (sentences) are stored in the computer, they become user knowledge and allow the computer to be programmed by these sentences to improve knowledge automation.

When the user enters the input statement (sentence) as in: open my electronic dictionary. the said application checks the KM SQL database/repository and if no near match of the input is found in the KM SQL database/repository, then a check of the input is made to the KM text file repository where the said application finds a near match to the Q line as shown in FIG. 2 line 1. Any combination of words that make up a English language statement (sentence) and near match corresponding words in line 1 of FIG. 2 will cause the said application to read line 2 in FIG. 2 and execute the attachment:

webdictionary: —This is a computer electronic word dictionary and when the user made up this attachment word and then input the sentence for the first time, the said application would offer a drop down attachment menu where the user would attach the word (webdictionary:) to wwp5.exe—the electronic dictionary executable computer program.

Line 3 in FIG. 2 will display this line (Please get my electronic dictionary.) when the user of the said application enters <space> m followed by any partial or full word or multiple words with any of the words in (Please get my electronic dictionary). Entering <space> m ple (short for please) will display one of four statements (sentences) stored in the KM text repository with the word please. If the user of the said application then uses the computer mouse to select the statement (sentence): (Please get my electronic dictionary.) the said application will again open the attachment: webdictionary: and execute the computers electronic dictionary application. The said application gives users the ability to hide the statement (sentence): (Please get my electronic dictionary. —see FIG. 18 second statement (sentence) from the bottom) from the <space> m dictionary input by changing menu_item: Please get my electronic dictionary. to: menu_hide_item: Please get my electronic dictionary. When the input to the KM text file repository (with menu_hide_item is in front of: (Please get my electronic dictionary.) is enabled, no listing will occur showing: (Please get my electronic dictionary.) as seen in the drop down KM text repository menu shown in FIG. 18 second statement (sentence) from the bottom. However, an English language input statement (sentence) to the KM text file repository like: (Please get my electronic dictionary.) will still make the said application run the dictionary application computer program.

As stated, the said application uses the KM text repository to store common computer functions (resources) and it is also used to open KM SQL databases/repositories such when open (only one at a time) the input words are directed to the KM SQL database/repository first, then to the KM text file repository, then to a search engine query if properly formatted which is not to be confused with the said application's attached URLs which open the URL(s) as stored in the said application. The said application applies its methods to its own internal help file. As an example, the said application uses the help KM SQL database/repository consisting of multiple statements (sentences) stored in this database/repository to give users a method to diagnose, define symptoms, and use symbol words and synonyms to get answers to questions regarding the said application. In this example, users can enter the following words at the said application's input (FIG. 1 location 2) defined to search for the following stored statement (sentence) in the ews help KM SQL database/repository: (show the architecture XXXdia diagram for the ews application 3.0.) with any of the said words entered into the application's input (FIG. 1 location 1): (get, find, locate, open, go show, display) (me, my, the), (architecture, design) (XXX, dia) (visio, drawing, diagram) (me, my, the) (ews, ienglishworks) (application, program) (3, 0). Any of these words can be substituted for the stored sentence (show the architecture XXXdia diagram for the ews application 3.0.) in the KM SQL repository/database.

When this statement (sentence) is input with any of the said application words, symbol words and synonyms from above, the said application will open the ews architecture diagram as shown in FIG. 9 (said application's KM SQL repository/database attachment table) line 1 under the column marked FileNameOrURL. To open this attachment, the said application matches the symbol words and or synonyms in the input statement (sentence) to the after mentioned sentence stored in the sentences' table as shown in FIG. 6 lines 1, 2, and 3, which represent one of N records in the KM SQL databases/repository. The match occurs when the user selects a statement (sentence) form the KM SQL database/repository drop down window (FIG. 12 as an example) or if the user enters a said statement (sentence) at the said application's input (FIG. 1 location 1) such that various permutations and combinations including these selected few which are:

1) get the ews design drawing.
2) find the ienglishworks drawing for application 3.0.)
3) and other such combinations and permutations of the said applications following words: repeated here as: (get, find, locate, open, go show, display) (my, me, the), (architecture, design) (XXX, dia) (visio, drawing, diagram) (my, me, the) (ews, ienglishworks) (application, program) (3, 0).

The input processing of the stored statement (sentence) (as learned by the computer when the user does <space> save and enters the sentence: (show the architecture XXXdia diagram for the ews application 3.0.) as shown saved in the KM SQL database/repository in FIG. 8 line 2 in the SQL solutions' table. This said stored/learned statement (sentence) represents the actual stored statement (sentence) with capital letters and punctuation. The same statement (sentence) is stored in the KM SQL repository/database sentences' table in FIG. 6 lines 1, 2, and 3 (represent one row in the KM SQL database/repository) with words being modified to include lower case words for upper case words, singular words for plural words and words that have apostrophes to no apostrophes i.e.: (didn't is stored as: did not) together with symbol words and synonyms.

Every word in the KM SQL database/repository solutions' table (FIG. 8 line 2) must have a corresponding word in the KM SQL database/repository sentences' table (FIG. 6 lines 1, 2, and 3—represents 1 of N stored statements (sentences)) with symbol words and or synonyms i.e.: (FIG. 6 line 1, column word1 contains the word: getfindlocateopengoshowdisplay which was stored in this cell from the said application's internal synonym database when the sentence was learned/saved using <space> save (then entering the sentence). getfindlocateopengoshowdisplay is a concatenation of: get, find, locate, open, go show, display).

Any input word: (get, find, locate, open, go show, display) matching this stored synonym word is part of the process to identify the stored statement (sentence) with the input words that can come from a machine, internet computer, human operator or other said device capable of sending English language statements (sentences) to the said application. Users can manually add other words to the KM SQL database/repository sentences' table to create other symbol words and synonyms (external synonyms cannot be concatenated and each word to be used as a synonym must be placed in its own separate database cell in the sentences' table) such that when a statement (sentence) is input, the said application will use these stored symbol words and synonym words as part of the statement (sentence) input matching process. Again, the manually stored synonyms cannot be concatenated (i.e.: car and vehicle cannot=carvehicle and stored in the sentences' table, but symbol words can, as in: Ews1 and dia which=Ews1dia (concatenated)) as is done when the said application stores a statement (sentence) using the <space> save and then inputting the statement (sentence). In this case, the said application uses its synonym database to store the synonym in the said applications KM SQL database/repository FIG. 6: line 1 (columns: word1, word2, word3, word4, word5 word6), line 2 (columns word7, word8, and word9) and line 3 (no words or synonyms are stored in these database cells) as an example.

Any stored English language sentence can be coded with symbol words and synonyms words (words that both can be substituted with the same or equivalent words of the English language either automatically done by the said application of manually done by the user by adding discrete synonym words in a cell by cell fashion in the said application KM SQL repository/database sentences' table). For example, the manual symbol word: XXXdia stored in the sentence in both the sentences' and solutions' tables as in: (show the architecture XXXdia diagram for the ews application 3.0.) where the symbol word: XXXdia is equal to: XXX and dia and where XXX can stand for something known to the user and dia could stand for the word (diagram) so, for example, if XXX is translated to: Ews1dia, the user could store selected sentences in the said application with the symbol word: Ews1dia. Then the user could enter either: Ews1 or dia or Ews1dia to sort for all those related stored sentence with the symbol word: Ews1dia.

If (dia) was entered on the said application's input, all stored sentences with the letters (dia) would be shown and the user could select a particular stored sentence based on the other words surrounding dia in the stored sentence. Again, if the letters dia were by themselves in a single stored sentence, the said application would automatically fire (execute) the stored sentence's attachment.

If the input sentence matches the stored words, symbol words, and synonyms words stored in the KM SQL database/repository FIG. 6 lines 1, 2, and 3, the said application will show the attachment from FIG. 9 line 1 under the column marked as: FileNameOrURL or the said application's architectural diagram. However, in addition to showing this attachment, from the said application's KM SQL repository/database attachment table, the said application will also read the stored statement (sentence) from the said applications KM SQL repository/database solutions' table (FIG. 10 line 1 in the column marked as: sentenceout or (Google what is the definition of a computer architecture?) where the statement (sentence) will be fed back into the input via FIG. 1 location 4, 5, (no near sentence match) to FIG. 1 location 8, 9 (no near sentence match) and will then use the internal stored configuration parameters to send a Google search engine query to FIG. 1 location 10 to location 11 to location 12 where a response will be posted on the users web browser from Google where the response defines the definition of a computer architecture.

So now with the input to the said application: (show ews application architecture.) the said application will show the diagram of the ews architecture and then have Google (or any other search engine provided it has the proper format configuration as defined in the KM text repository) define a computer architecture. The said application, processes the input (as previously specified) by working to get an input near match to the stored words first in the KM SQL database/repository, then in the KM text file repository, then building a statement (sentence) based on the Internet search criterion in the KM text file repository (FIG. 5 lines 1 and 4 namely: http://www.google.com/search?hl=en&q=what+definition+computer+architecture) and then building a software agent (FIG. 11 lines 1 and 4) if one is so defined.

Figure 17:
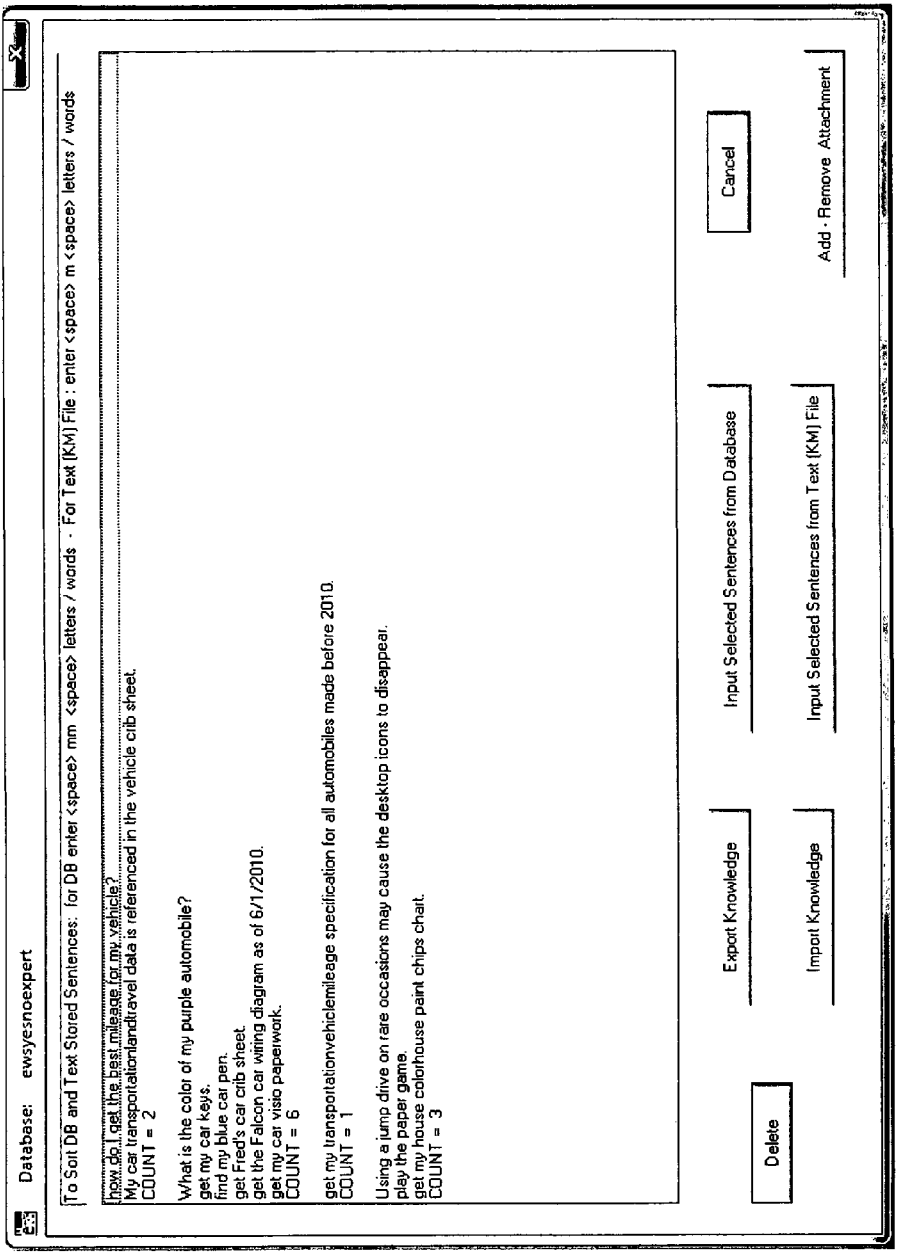
FIG. 17 shows sorting of KM SQL repository/database by symbol words and synonyms.

If the said application KM SQL database/repository contains stored statements (sentences) with the words: car, automobile, and vehicle and if they are found in the synonym repository and the user enters the word: vehicle, the said applications KM SQL database/repository menu processor will display each stored statement (sentence) in group 1 if they contain the words: car, automobile, and vehicle. Entering the word car, vehicle or automobile will produce the same screen listing as shown in FIG. 17.

If there were only one stored statement (sentence) with the word: car or vehicle or automobile in the said application's KM SQL database/repository and the user or machine or device entered the word: car, the said application would automatically execute (fire) the stored statement (sentence's) attachments from either the solutions' table FIG. 8 line 1 (as an example) under the column: sentenceout (if data was in this cell it would be an English language sentence) or from the attachments table FIG. 9 line 1 or 2 under the column Exe (computer executable program—i.e.: sol.exe as an example) or under the column FileNameOrURL as an example. Once the KM SQL database/repository is accessible for user input from a person or machine or device sending English language statements (sentences) to the said application, users can get a listings of all stored statements (sentences) by doing <space> mm.

If a particular topic was needed and if the said application's KM SQL repository/database help expert were open, a user could enter (for example)<space> mm arch matching the word architecture in a stored sentence and only one stored sentence had the word architecture then one statement (sentence) would appear in the drop down menu namely: (Show the architecture diagram of the ews application 3.0.) where ews is the acronym for the said application and the remaining stored sentences in the KM SQL database/repository help expert would be shown (separated by a space in the drop down menu and the next stored statement (sentence) in the said application's KM SQL database/repository—see Reference 10—end of this detailed description.

Note that entering the letters <space> mm arch will search each stored statement (sentence) and will display those statements (sentences) in a drop down menu in groups as described in Reference 10—end of this detailed description. If a user types in an English language statement (sentence) as in: (Show me the drawing of the ews application. —The actually stored statement (sentence) in the help KM SQL database/repository is: (show the architecture XXXdia diagram of the ews application 3.0.)—FIG. 8 line 2) the said application will show the same ews architecture diagram and go to Google due to the said application's symbol word and synonym processing methods.

If the letters: arch were the only letters in a stored statement (sentence), the said application would execute its attachment automatically—shows a diagram of the said application's architecture and then goes to Google to get a definition of a computer architecture. In order to prevent automatic execution of an attachment belonging to a unique stored statement (sentence)—(in group 1 by itself—see FIG. 17 as an example) users have the ability to use: <space> mm arch to show all stored statements (sentences) without showing the statement (sentence's) attachments. In addition to processing input words statements (sentences) the said application allows users to access KM SQL databases/repositories with an input like: (open my ews help database.) FIG. 4 line 7. This statement (sentence) is stored in the KM text repository and gives users access to the tables that hold the KM SQL database/repository sentence data for the said application.

If the user wants to add words, symbol words or synonyms to the stored sentence: (show the architecture XXXdia diagram for the ews application 3.0.) the user would open the said application KM SQL repository/database using words (pick for KM text repository menu sentence or an input sentence like: (open my ews help database db.) and after it was open the user would then select the sentences' table referring to FIG. 6 and FIG. 7 and in FIG. 7 adding the words: (world, view) in columns word10 and word11.

Remembering that in FIG. 8 for the KM SQL repository/database that line 2 is the corresponding sentence stored in the solutions' table for which there is a corresponding statement (sentence) stored in the sentences' table. But note that the solutions' table in FIG. 8 line 2 does not have the words: world and view. This means that a single input word, at the input, like the words: world or view or both will not show the stored sentence (show the architecture XXXdia diagram for the ews application 3.0). However, users can now input a sentences like:

1) show me the world view ews architecture.
2) get the ews architecture view.
3) and other input sentences with the permutations and combinations of all the words, symbol words, and synonyms contained in FIG. 7 lines 1, 2, and 3 (no words are stored in these cells).

It should also be noted that the words stored in the sentences' table can be in any order. The intended results are to make additional synonym words for the stored statement (sentence) (show the architecture XXXdia diagram for the ews application 3.0.). So not only can users add words to the said application's sentences' table and then make up sentences with the new words to have the said application execute the stored sentence's attachment(s), but they can also still use the standard synonyms stored automatically by the said application, for example, in FIG. 7 line 1 columns (words (1,2,3, 5,6,7, and 8)—there is no synonym for numbers except if users wanted to store the words (manually in either the KM text repository of the KM SQL repository/database as in (3.0) (three decimal zero) to make a significant amount of input sentences near match the stored sentence—this is what is meant by near match. Also, users can store a new sentence and attach it to an existing attachment so that two differently worded stored sentences can execute the same attachment—this would be called a synonym sentence and now two difference sentences when input into the said application will show the same attachment.

The said application is very flexible to the input words entered by uses to get to the said application's attachments. Note also, that the words: world and view could be added to the words stored in the FIG. 8 line 2, that would become: (show the world view architecture XXXdia diagram for the ews application 3.0). This would allow users to enter: world, view or both at the input of the said application and if these words were the only ones in stored sentence, the said application would fire and show a diagram of the ews architecture and then go to the Internet and get the definition of a computer architecture as defined by the attached stored sentence in FIG. 10 line 1 under the column sentenceout or (Google what is the definition of a computer architecture?).

Lastly, the words (world and view) cannot be concatenated as in worldview and then compared to other internal synonyms if ones existed for the words: (world and view) such that if one were to enter the word: world, for example, the SQL menu system would show synonym sentences for any word as a synonym for world and not show the corresponding sentence with the word: worldview.

The said application is fully functional using English language statements (sentences) to initiate computer dialogs (computer files that can be opened that specifies user instructions) for the purpose of automating work processes. Any device that can send an English language statement (sentence) to the said application—that is, for example, a device that receives an event and that within the device that event is mapped to an English language statement (sentence) so as to send one or more English language statements (sentences) to the said application where, for example, the said statements (sentences) have as an attachment within the said application (a diagnostic) such that the diagnostic may cause the said application to implement a local response or may cause the said application to send other English language statements (sentences) or other such data to remote computers implementing an appropriate response across other computer systems and computer networks using the said application to implement a computer response.

Any file that has diagrams where part of the diagrams have text so that the text can be pasted into the said application as English language statements (sentences) where pasting URLs has limitations in that they are not parsed by the rules of the English language and are therefore limited in terms of labor automation as can be done with the said application using attachments from either the KM text repository or the KM SQL repository/database(s).

Processing English language statement (sentence) via a computing device using the said application makes it possible to get very specify data or to initiate very specific computer processes that would not be possible without using the words of the English language including symbol words and synonyms.

The said application is designed to allow only English language sentences through (FIG. 1 Item 2) to repositories defined in (FIG. 1 items 4, 5, 8, 9 to item 10 to item 11 and back to item 2 or out to item 12 depending on the attachment type. Note, the said application has the ability to process multiple English language statements (sentences) at the input from either a user, device, or machine on or off a computer network. Note, also that when a single word is entered (see FIG. 16 as an example) it actually maps to the full sentence and that full sentence is then fed back to the input (FIG. 1 location 1) from FIG. 1 location 4 and 5 or from FIG. 1 location 8 and 9 or to a search engine or software agent to FIG. 1 location 12 as specified with the configuration parameters stored as sentences in the KM text repository.

On start up of the said application, users can store an auto-start statement (sentence). In the case, where the user would like to open the said application's help file expert, the stored statement to auto start the said application using a desktop icon to initiate the start up of the said application and there after using the start up sentence to open its corresponding KM SLQ repository/database such as: get my internal ews help expert—see FIG. 4 line 4 noting that any combination of these word or others words defined by the user in this line will cause the said application to open the KM SQL database/repository whereby users can access stored English language statements (sentences) defining symptoms, general knowledge or other such computer attachment functionality (including attached English language statements (sentences)) of the said application or any other user defined knowledge database using the said application's English language KM text repository or KM SQL repository/database system.

The auto start statement (sentence) can be made up of one or more English language statements (sentences). Each Expert (a KM SQL repository/database) with specific knowledge; or an instance of the said application can be pointed to by a computer desktop shortcut and those Experts can have their own auto-statement (sentence)(s) to open the specific KM SQL database/repositories.

The KM text file repository can have hundreds of KM SQL databases/repositories and each can share a common KM text file repository (which acts to carry out common computer activities for the KM SQL repositories/database contained within the active KM text repository). The KM text repository is indexed to permit fast, full, and partial word searches through the KM text repository. Once a near match (allowed by symbol word or synonym processing) is found in the KM text file repository using the words stored in the Q part of the KM text file repository, the said application then executes the corresponding A part component (the A part just after the near marching Q part) of the stored text in the KM text repository—see FIG. 2 lines 1 and 2 as an example.

Multiple attachments can be opened with a single input statement (sentence) to the said application or users can enter several statements (sentences) (see Reference 5—end of this detailed description) at the said application input FIG. 1 location 1. Below is a representative example of what was taught to the computer by the said application and stored in the current KM SQL database/repository—Each sentence below (between the double quotes) has been stored in the currently active KM SQL repository/database:

"Show me the Ews code for OLE automation using MS Excel. run the ews ole excel demo program. Get me an example of the prefetch code for the Ews application. Google what is the time in London England? Go to my SharePoint site and get the Mar. 2, 2010 CMDB proposal. Query the Remedy ATS system for users who have been approved by IT security."

Inputting OLE (from the first statement (above) between the double quotes starting with the statement (sentence) (Show me the Ews code for OLE automation using MS Excel.) where OLE is a unique word in all the stored statements (sentences) in the current open KM SQL database/repository and would then cause the said application to show the OLE Ews computer software code. —single statements (sentences) that are unique automatically run their attachments.

If the next input statement (sentence) was (run the ews ole excel demo program.) between the double quotes above, the said application would run the computer application based on the software code attached to the statement (sentence) (Show me the Ews code for OLE automation using MS Excel.). Likewise, if a user enters: LE mation, (partial spelling of the learned statement stored in the said computer application and if these letters are unique) the application will show the same OLE automation code otherwise it will show all stored statements with LE and mation. On the other hand, if a user just enters some of the words that are in the above statement (sentence) like: get the OLE spreadsheet code—the said application will again show the same OLE automation code even though the input statement words don't match all the words stored in either the KM text repository or the KM SQL database/repository (namely: (Show me the Ews code for OLE automation using MS Excel.) that was learned by the said application for the KM SQL repository/database in the learn or save mode.

From the stored statements (sentences) between the double quotes and repeated from above:
"Show me the Ews code for OLE automation using MS Excel. run the ews ole excel demo program.
Get me an example of the prefetch code for the Ews application.
Google what is the time in London England?
Go to my SharePoint site and get the Mar. 2, 2010 CMDB proposal.
Query the Remedy ATS system for users who have been approved by IT security."
From the above it is possible to enter the following partial words as in:
(OLE automation. ews prefetch code. Sharepoint CMDB proposal. Remedy ATS security.) to get the said application to execute the attachments as though the full sentences were entered for the sentences between the double quotes above remembering that partial words that are unique to a stored statement (sentence) actually find their stored sentence and then feed them back to the input as shown in FIG. 1 location 1. Therefore, as stated, the said application will only process true English language sentences.

Use of a Natural language (like English) is symptom/problem centric meaning symptoms and problems can be described in great detail (with stored English language statements (sentences)) and later recalled by entering partial letters, words, and statements (sentences) at the said application's input to solve business problems and or other user data needs from anywhere on a computer network.

Since users can store symbols words and symptoms (or anything else that can be made from the words of English language sentences) including numbers and decimal numbers (see FIG. 12 $10^{th}$ sentence up from the bottom namely ip203.77.133—an ip address that can be sorted, for example, with input: 133) they can also store problems and their solutions using symbol words and synonyms, as stored English language statement (sentences). Stored sentences can be declarative, imperative, and interrogative and can be sorted by partial, single or multiple words.

This method allows users to train the computer using their thoughts, insights, knowledge, and any other knowledge that can be constructed from user experiences, formed into English language statements (sentences), and then saved into the said application using words, symbol words and synonyms.

In addition, KM SQL database/repository data can be exported though common email systems by selecting English language statements (sentences) from the currently open KM SQL database/repository SQL menu system such that after selection of those statements (sentences), users can then select the Export button (as an example see FIG. 12 and the Export Knowledge button on the SQL menu) which will cause the statements (sentences) and attachments to be exported to a designated user directory. After an export is made to a user selected computer directory, users can then attach export files to emails whereby on receipt of such said application exported files and data, the receiving user can then place the exported attachments in a desired directory and with the said application active at the receiving end, can import the said statements (sentences) and attachments of the export by clicking on the said application's KM SQL repository database menu and clicking on: Import Knowledge to import knowledge with a designated file name ending in: *.pc which will cause the said receiving said application to import SQL sentences', solutions' and attachments' table data for the currently open said application KM SQL repository/database.

The mapping of attachment file locations is automatically mapped to their location at the time those attachments were stored in their corresponding directory by the user receiving the import via email. Thereafter, the said application having received the said user imports can use the said imported knowledge as it would normally be used by the said application by associated users.

The said data architecture is distinct in that, unlike large internet search sites that use spiders to index data on the Internet and return a very large and sometimes unrealistic amounts of search results, the said data architecture limits the data (by the kinds of knowledge stored in English language sentences) based on a particular user domain as defined by the currently open KM SQL repository/database. Knowledge repositories (KM text repositories and KM SQL repository/databases) could, for example, specialize in symptoms for a particular computer application. If another KM SQL database/repository is needed it can be switched to with an English language statement (sentence) (using the common KM text repository) or an instance of the said application can exist on the desktop such that pressing the icon will cause the said application to start with a said stored start up statement (sentence) in the KM text repository (that can be shared by other said application instances) and open the KM SQL database/repository—see Reference 7—end of this detailed description. The said application can share KM text repositories and use one of the statements (sentences) in that repository to open a designated KM SQL database/repository. In doing so, the data architecture tends to limit the results unrelated to the subject area of interest as requested by the user.

In general, users set up knowledge repositories based on the type of data to be stored in the knowledge repositories (KM SQL database/repository or KM text repositories with English language statements (sentences) that are generally domain specific). However, users still have the option to store knowledge (defined by whatever symbol words, synonyms, and words that are in the stored/learned sentences in either the KM text repository or the KM SQL databases/repositories that may be outside the domain of the selected KM SQL database/repository or KM text repository.

The KM text repository system can contain an almost unlimited number of pointers (English language statements (sentences)) to the KM SQL databases/repositories—each database (FIG. 4 line 4) can have specific words that identify a specific KM SQL repository/database.

The concept of symbol words and symbol word sentences where symbol words are made up by users (usually by concatenation of words as in: electronic dictionary=edic). Then edic can be a word stored in a sentence that is stored in either the KM text repository or the KM SQL repository/database) may not seem to be practical on first examination except for the fact that the said application can process words within words in both the KM text repository and the KM SQL repository/database.

Figure 13:
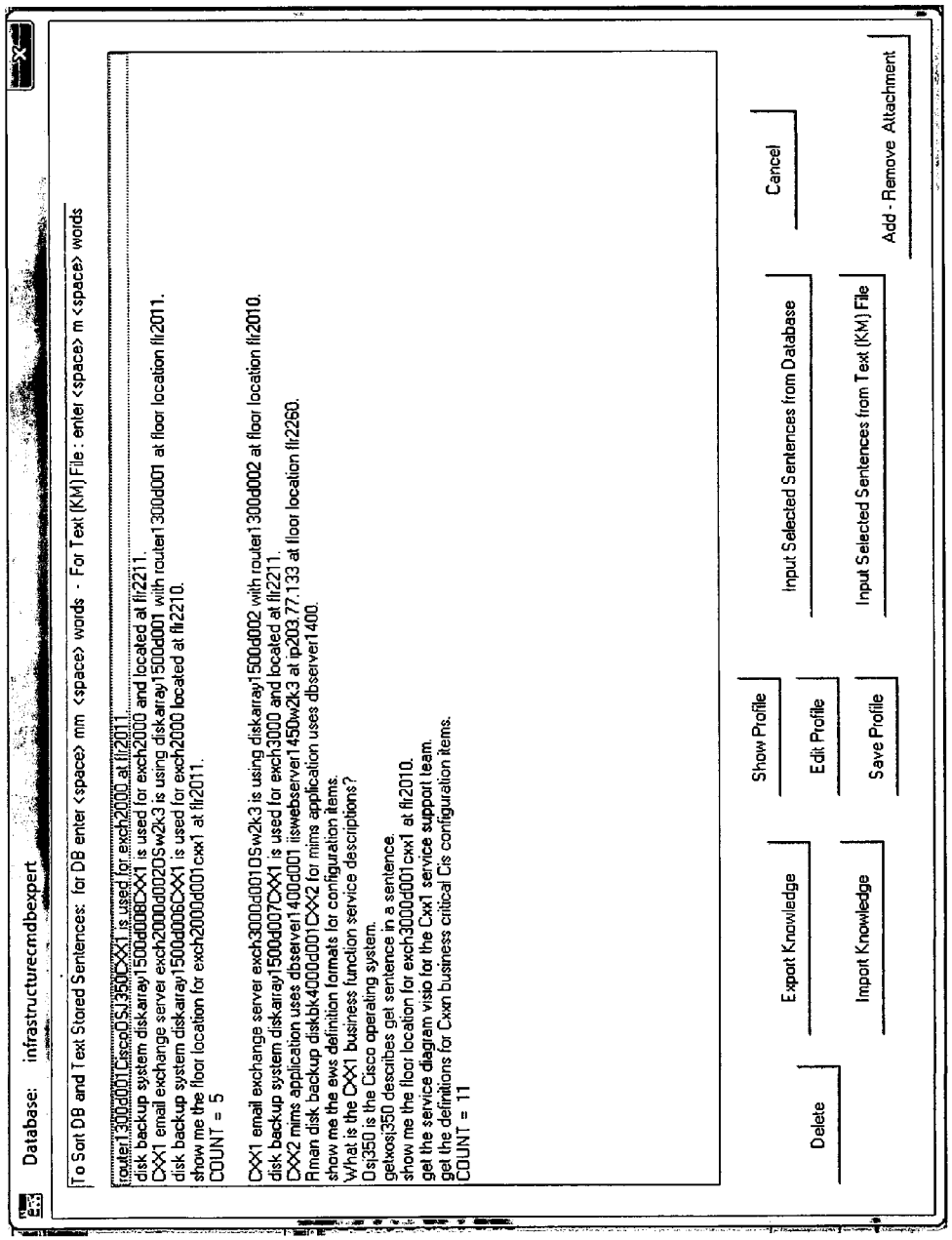
FIG. 13 is a sorting by the input: exch2000 in FIG. 12.

As an example, when a user stores the sentence in the KM SQL repository/database: (get my colorhouse paint chips chart.)—it is stored in the sentences' table as follows (see FIG. 6 as an example of KM SQL repository/database format): getfindlocateopengoshowdisplay, memythe, house, colorhouse, paint, chipflakefleck, chartgraph and stored in the solutions' table as: get my house colorhouse paint chips chart. Note, if an attachment to this sentence was made it could be the attachments shown in Reference 6—end of this detailed description. The input sorting mechanism for both the KM text repository and the KM SQL repository/database have very similar properties as is shown in FIGS. 13 and 18.

Once the above sentence is stored (get my house colorhouse100 paint chips chart.) with the user's attachment(s) in the KM SQL repository database, the attachment(s) can be acted on by the said application using the following example word input combinations:

1. find my colorhouse100 house paint chips.
   find, my, house, color, paint are defined as synonyms and colorhouse100 is a symbol word used to sort the KM SQL repository/database.
2. open my home pigment coloring graph.
3. 100

The said application shows the stored statement (sentence): (get my house colorhouse100 paint chips chart.) along with any other stored statements (sentences) with the characters: 100. User can select the after mentioned statement (sentence) or any others that are listed in the open KM SQL repository/database as shown in the example drop down KM SQL repository/database (FIG. 12) or the KM text repository (FIG. 18) which ever applies.

4. Show my paint graph for my house.
5. Other word combinations of the words in the statement (sentence): (get my house colorhouse100 paint chips chart.) and their associated synonyms allow users to input several word combinations and permutations to help ensure that users have word input flexibility to get the data associated with each stored statement (sentence) attachment.
6. Show my color paint chips 100. (not allowed)

Stored sentence is: (get my house colorhouse100 paint chips chart.)
and is not allowed since the symbol word: colorhouse100 is considered a whole word and will not match the word: color, house, 100 as part of an input sentence (Show my color paint chips 100.) however, inputting: orho (not a sentence) is part of the symbol word: colorhouse100 and along with other letter inputs (or other letter combination for this symbol word will cause the input KM SQL repository/database sorting algorithm to find these letters and present them in their stored sentences to the user in the drop down list box as represented (by example only) in FIG. 13.

If more than one stored sentence contains these letters (orho) then each sentence is displayed in the KM SQL repository/database drop down menu, which will allow the user to select those sentence with the computer mouse so the said application can run the corresponding sentence attachment (s). The user is free to choose all sentences with the letters (orho) and each will be processed by the said application as an English language sentence and in turn, each sentence will process the said application's attachments. If only one stored sentence contained the input letters (orho), the said application would automatically process that sentence's attachment (s) and the sentence would not be displayed in the said application KM SQL repository/database drop down menu. To allow users to see the only sentence with the letters (orho) so that the said application would not automatically process the one sentence attachment, users can enter: <space> mm orho and the single sentence would be displayed (separated from all the other sentences by a space (by example only) as represented by FIG. 14) if, in fact, there was only one stored statement (sentence) with the letters: orho If synonyms do not exist for a particular word that is part of a sentence to be saved in the KM SQL repository/database, user can still add their own. In the above example where the sentence stored in the KM SQL repository/database was: (get my house colorhouse100 paint chips chart.) the synonym word for (get) is automatically stored in the sentences' table by the said application as shown by: getfindlocateopengoshowdisplay. This is stored in the first row column record in the sentences' table with other words being stored in the remaining row columns as in: getfindlocateopengoshowdisplay, memythe, househomedomicleabodedwelling, colorhouse100, paintpigment, chipflakefleck, chartgraph in the said application's sentences' table.

If there were no synonym for (get) in the synonym database, the user would then input a sentence in the said applications <space> save mode then enter the sentence as in: (get find locate open go show display my colorhouse paint chip chart.)—each word for the user defined synonym (get) will now take up seven row column cells in the KM SQL repository/database in the sentences' table vs. one row column cell for the word synonym for (get) namely: (getfindlocateopengoshowdisplay). Note again, that symbol words are generally the abbreviation of words which may be concatenated (and included in the storage of and English language sentence for the said application) and do not have a symbol word database as do synonyms that have a synonym database that is used to substitute input saved sentence words with their synonyms in the said applications KM SQL repository/database sentences' table.

The KM text repository and the KM SQL repository/database both use symbol words and synonyms but the KM text repository stores synonyms as manual entries and discrete words in the KM text repository whereas the KM SQL repository/database stores synonyms as words from the synonym database in one row column cell in the KM SQL repository/database in the sentences' table. Symbols words are stored in both the KM text repository and the KM SQL repository/database as made up words generally from the concatenation of two or more words including numbers.

In each case, there is no symbol word database and the symbol words are stored in the KM text repository by example as in FIG. 2 line 1 or the Q line and the word: (edic). Once all the elements of the KM text repository (the Q, A and menu_item) are created, users then save the KM text repository (resave the file) and then call the attachment (the A line) whereby (if a file is attached), the said application will then open the said applications file menu selection list box which allows the user to select one of more files as attachments.

If statements (sentences) need to be attached to the stored sentence in the Q line, they may be attached for the KM text repository as by example as shown in FIG. 4 lines 5 and 6 or the A line noting that one or more sentences stored in the KM text repository can execute stored sentences in the KM SQL repository/database and their respective attachments, and whereby those attachments could be English language sentences that could be stored in the KM text repository.

Likewise the KM SQL repository database stores synonyms in the sentences' table based on synonyms stored in the synonyms database (there is no synonym database for the KM text repository) with the exception that discrete synonym words may be added to the sentence (at save time <space> save enter) or if a synonym exists for saved (learned) sentences in the KM SQL repository/database it will be added automatically to the respective row column (cell) in the sentences' table. Word symbols by example FIG. 2 (edic) and FIG. 6 (word4 cell—XXXdia) are included in the storage of saved sentences in both the KM text repository and the KM SQL repository/database respectively.

Figure 12:
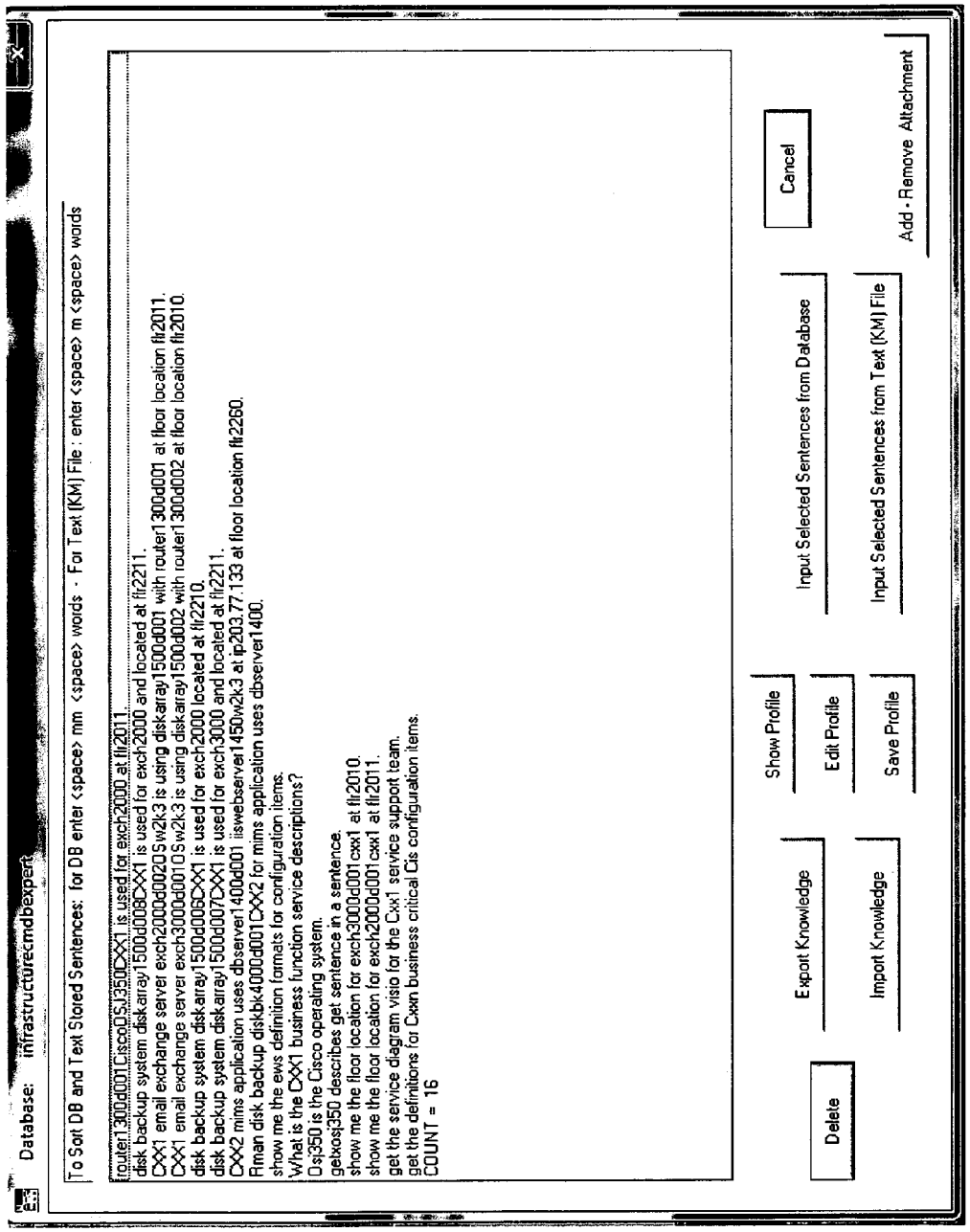
FIG. 12—Shows the stored English language sentences that make up a CMDB (Configuration Management Database) in a KM SQL repository/database that is open the a sentence stored in the KM text repository.

Creating a CMDB (Configuration Management DataBase) using symbol words and synonyms. Refer to FIG. 12—this a non sorted KM SQL repository/database for stored English language statements (sentences) that define the elements or the Configuration Items (CIs) which, in this case, define the components and their relationships within each sentence and across all other sentences in this repository/database. In IT (Information Technology) data centers it's important to know these relationship since they represent the interactions between such things as disk drives, software operating systems, routers (decides which data goes to computing devices) and other such hardware and software in order to properly diagnose and repair these IT components otherwise known as Configuration Items or (CIs). Each sentence stored in FIG. 12 is made up of nouns that take the form of words, symbol words, synonyms, and together with other words and numbers are formed into English language sentences that define the relationships of the words with other words in the sentences that make up declarative sentences or facts.

So, it can be said that these nouns that in many cases are CIs (symbol words and synonyms) formed into English language sentences that do, in fact, conveniently describe CI relationships that would permit the understanding and diagnosis of IT components in an IT data center. For example, if an email server fails and prevents users for getting or sending emails it could be because of the email server itself or it could be because of one of its related CIs has failed or on a English language sentence level it could be that one of the nouns in the stored sentence has failed. All stored statements (sentences) in any KM text repository or KM SQL repository/database must be an English language sentence.

In FIG. 12 third sentence from the top (CXX1 email exchange server exch2000d002OSw2k3 is using diskarray1500d001 with router1300d001 at floor location flr2011.) is an English language sentence (declarative) having a noun and verb phrase (noun phrase (CXX1 email exchange server exch2000d002OSw2k3) and the verb phrase (is using diskarray1500d001 with router1300d001 at floor location flr2011.) such that the components in the sentence i.e.: (a symbol word) exch2000d002OSw2k3 is a CI having associated CIs i.e.: (diskarray1500d001 with router1300d001 at floor location flr2011.) in which case this sentence can have attachments to additional CI information and related to other sentences within this said KM SQL repository/database as represented in (FIG. 12) and deemed beneficial to those who would use this knowledge at a later date to determine the relationships and status of IT infrastructure components (servers, disks, routers etc.).

The purpose of the storing CIs (words, symbol words, and synonyms) is to show relationships to CIs within one stored statement (sentence) and from one sentence to the next and to have the said attachments to these statements (sentences) to see additional data for the purpose of quickly managing and fixing problems associated with IT Infrastructure outages.

Note, that industry CMDBs exist but they are not based on the English language and therefore do not take advantage English language sentence structures using symbol words and synonyms and the linking of English language sentences within and across databases using LANs or WANs. This particular CMDB (KM SQL repository/database) is use to help IT personnel see the relationship among CIs (within sentences and across sentences connected to other repositories/databases) in order to help isolate problems when suspected CIs that are not working as defined by the symbol word: exch2000d002OSw2k3 and is made up of a email server (exch2000), and d002 a user define component of the email server (exch2000), and OSw2k3 is the Operating System (OS) defined as: w2k3—an abbreviation for Windows 2003. Part of the diagnosis or IT (Information Technology) systems is to know what they are part of (other CIs).

For example, the email service provided by the email server (exch2000d002OSw2k3) has been identified as not working which prevents users from reading their emails. The first step is to use the said application such that entering (at the input—FIG. 1 location 1 with input screen example only shown in FIG. 16) the symbol word: exch2000. This results in the sorting of the said application's stored sentences as shown in FIG. 13 remembering that each stored statement is an English language sentence (declarative for the most part) and by their nature convey complete thoughts as in relationships to other nouns (represented by a symbol words) and where by symbol words can be related to other stored sentences within the said selected application's KM SQL repository/database. Once exch2000 is entered into the said application's input, resulting in FIG. 13, users can see all the related CIs (i.e.: router1300d001 considered a noun and part of third sentence from the top in FIG. 13) and their potential for failure causing the exch2000 (email server) to have failed if it itself is not failing.

Note by entering: exch2000 as shown in FIG. 13 above where COUNT=5, users would see all the CI (Configuration Item) relationships to the email server: exch2000. Also noted is the third sentence from the top of FIG. 13 namely: (Cxx1 email exchange server exch2000d002osw2k3 is using diskarray1500d001 with router1300d001 at floor location flr2011.).

From this, a user could look at the first group of statements (sentences) seeing (in the first sentence): Osj350 (this sentence has the symbol word: exch2000d002OSw2k3 in it) and then entering Osj350—see input screen FIG. 16 and after doing so would cause the said application to get the first said sentence in FIG. 14 (would automatically get its attachments because it's the only sentence above COUNT=1 and whereby the said attachment is shown in FIG. 15) such that this attachment(s) with data about the router1300 and its operating system (OSJ350 or shown as Osj350) could be at fault causing the said exch2000 email server to fail which would prevent users from getting their emails. The network operating system letters (Osj350) is contained within 3 sentences in FIG. 12.

Within the same KM SQL repository/database (the CMDB knowledge repository about CIs (Configuration Items)) is additional information that tells users the CI nomenclature used to define CIs that can be included in additional stored English language sentences with this KM SQL database/repository. The after mentioned KM SQL database/repository for IT Configuration Items (CIs) can be called by an English language sentence or opened using a desktop shortcut using an instance of the said application with a start up sentence that opens a particular KM SQL repository/database for a designated CMDB. The CI methodology using English language statements (sentences) does not have to be constrained to just IT (Information Technology) CIs, but it can also be used in any English language expression of CIs (English language statements (sentences)) using symbol words and synonyms.

In Summary:

The said application uses symbol word and synonym processing on store English language sentences to significantly improve the computer's ability to recall stored knowledge. This is further enhanced by forcing the computer to work exclusively at the English language level and to further make it easier for users to store knowledge and then to recall this knowledge at a later date to improve data recall and computer automation. The said application is capable of sending multiple queries to remote databases or sending out multiple URLs across LANs and WANs and or over computer networks to cause remote sentences to be near matched and therefore their attachments causing actions to be activated on remote computing systems and or receiving answers from remote computers and devices over computer networks or other networks including LANs and WANs.

Synonym processing occurs at three levels:

1) When user store and English language sentence, they can add synonyms to the KM text repository and likewise add the synonym words to cells in the KM SQL repository/database. Adding words to the sentences' table for the stored sentence whose attachment plays the computer solitaire card game can further enhance synonym processing. For example adding the words: big fog and then inputting the sentence: (play my big frog game.) will cause the said application to play (execute) the computer game of solitaire;

2) In the KM SQL repository/database many words (in the save sentences mode) already have synonyms. Synonyms are picked up during the storage of and an English language sentence from an internal synonym database and are added together i.e.: (get, find, locate, open, go show, display) and stored in the sentences' table as: getfindlocateopengoshowdisplay occupying only one cell in the KM SQL repository/database vs. seven cells if the synonym were stored as (get, find, locate, open, go show, display). This means that any other stored words in a particular SQL record (my map) can use any of the synonyms (get, find, locate, open, go show, display) verbs as in: (get my map. find my map. locate my map. open my map. show my map. display my map.) to get a user's map as defined by the attached map;

3) One stored English language sentence can be attached to one or more computer resources i.e.: files, computer programs, URLs etc. The words in the after mentioned English language sentence can be totally different from another stored English language sentence (a synonym sentence) that is connected to the same attachment.

For example, an input English language sentence could be: (I like to read the newspaper.) in which case would cause the said application to run the computer game of solitaire.

Synonym sorting the KM text repository and the KM SQL repository/databases: As detailed earlier, entering words like: (car) will sort the KM SQL repository/database) and show all stored sentences with the words: car, automobile, and vehicle. Likewise entering the words automobile and vehicle will again sort the KM SQL repository/database and show all stored sentences with the words: car, automobile, and vehicle. This capability significantly improves systems that are designed to help users whereby normally if users don't input the exact same words that are stored in help files (even though this information could assist users) they will never get the help they need. This is shown again in FIG. 18.

For example, a synonym for the word (expert) would have to be inserted in all Q lines (as shown by example only) in line 1 or the Q line of FIG. 2 and inserted in all menu_item lines as shown by example only in FIG. 2 for the menu_item line. In this case the word (hotshot) could be added to all sentences stored in the KM text repository that have the word (expert) such that:

<space> m hotshot would show all menu_item lines where now in FIG. 18 first stored sentence would show: get my company improvement expert hotshot.

Symbol Word Processing:

Symbol words are generally the concatenation of one or more groups of letters (Ews+dia) such that a stored sentence with the letters: Ewsdia can sort the KM text repository or the KM SQL repository/database with inputs like: ews, Ews, wsd, (wsd in the middle of the letters: Ewsdia) dia etc. This capability allows for the creation of an English language based CMDB as shown in FIG. 12 and which further allows the data in FIG. 12 to be sorted as in FIG. 13. Each entry in FIG. 13 is an English language sentence whose word components (normally nouns) are Configuration Items (CIs) whereby the CI's can be used to sort across all stored sentences in a particular KM SQL repository/database.

If <space> mm exch2000 is entered, all sentences with exch2000 are presented on the screen in group 1 (above COUNT=5) in FIG. 13. If 00 is entered every sentence with the numbers for the nouns (i.e. dbserver1400) is shown in the first group and if any one or more sentences are selected by the mouse, all those sentence's attachments will be shown on the computer screen.

The combination of symbol words and synonyms used with other English language words and stored in the form of English language sentences in the after mentioned repositories can easily be recalled as stored knowledge. Stored knowledge, in turn, is connected to (attached) to other computer/device resources such that when users, for example, input sentences like: (play cards. play a game of solitaire. play my favorite computer game.) and other combinations and permutations of the same said sentences will cause the computer to run (execute) the solitaire computer card game. For those instances where the said knowledge (English language sentences stored in both the KM text repository and the KM SQL repository database) is not known, users can enter single words (no verbs unless they are by themselves) together with symbol words and synonyms to find specific knowledge related to a user's needs.

The benefits of the said application include but are not limited to the following:

1) Multi sentence input using both symbol words and synonym processing—In one example, users can paste English language sentences from a computer file that a said sentence attachment to the said application and cause the said application to open attachments such as computer files, remote SQL database, URLs, run computer programs, software agents, and queries to search engines using synonym processing.

2) Storage of English language sentences in text and SQL databases allowing the said application to communicate between repositories in the English language using symbol words and synonyms.

3) Allow users to use the English language with symbol words and synonyms and store knowledge in easy to understand English—no computer codes or special methods required to effectively use and operate the said application—English language knowledge can be stored and retrieved from across computer networks.

4) A special case example is using the said application to build CMDB (Configuration Management Database) repositories but with the exception that these are stored in English language sentence format—declarative, imperative, and interrogative) and can be attached to files, URL, SQL database, computer programs, and any other computer resource to allow users to: fully understand (the English language); manage (store, delete, and add to partial, full words, and sentences using symbol words and synonyms); and control (connecting English language sentences to other English language sentences and other computer resources—see Reference 6—end of this detailed description).

Uses:

Any method/system/process whereby ordinary users want to store English language statements (sentences) so that these statements (sentences) can be later recalled (constitute stored user knowledge) such that inputting words will display synonym sentences and symbol words and aid in sending synonym words to Internet search engines and other such Internet web sites that would be aided by synonym processing of English language words.

CIs of any type can be used with synonyms to form English language sentences and then stored in KM text repositories or more preferably into KM SQL repositories/databases to better automate: knowledge management activities; easy lookup using symbol words and synonyms, relationships between stored sentences; linking sentences together such that one input matches one stored sentences which has multiple attachment per sentence or has connections to several sentences (see Reference 5—end of this detailed description) each with their attachments which could be stored sentences with all their attachments.

As some examples, CI type repositories not related to IT components using symbol words and synonyms could be used in health care, litigation cases, national security, and just about anything that uses the English language where by the said application can use and process words to improve knowledge and end user automation of any user defined process. At a high level (at the human level) there is no known process that cannot be automated using the said application and human language processing.

REFERENCES

Reference 1

Covington, M. (1988): Prolog Programming in Depth—ISBN 0-637-18659-8 (soft) online at: Institute of Artificial Intelligence—The University of Georgia—Athens, Ga. 30602 and book on Prolog pages 401. The following rule (S→NP VP) in what is known as a Context Free Phrase Structure Rules and are used to process an input string of characters to determine if the input string of characters constitutes an English language sentence.

The said application looks at each input string of words and if it is determined that the string of input words is an English language sentence, then the string of input words will be stored in the said application's KM SQL repository/database—storing sentences in the KM text repository requires that sentences have nouns and verbs as is indicated in FIG. 2 line 1 or the Q line. The stored sentences will be used to compare the input English language statement (sentence) to the KM text repository or the KM SQL repository/database.

In a special case, the input English language sentences are parsed (removing certain words per a configuration specification as shown in FIG. 5), modified by synonyms in certain cases, and sent to the Internet.

When the said application forces words to be stored as English language sentences it works to make sure complete thoughts (S→NP VP) are stored in the said application's knowledge databases (KM text repository and KM SQL repositories/databases). In this example, S=sentence, NP=noun phrase, and VP=Verb Phrase. The declarative sentence: The dog was home. The dog=NP, and was home=VP and where the NP (The dog) has the determiner (The) and the noun (dog). The VP (was home) has the verb (was) and the noun (home).

Reference 2

LPA Prolog is a registered trademark of LPA Prolog online at: A web site in England selling WIN-PROLOG Reference 3

Word definitions referenced and synonyms at: An electronic dictionary from WordWeb Reference 4

Symbol words stored in sentences and by example in FIG. 12 first sentence shows symbol word: router1300d001ciscoosj350cxx1 and is part of the stored declarative sentence: (router1300d001ciscoosj350cxx1 is used for exch2000 at flr2011.) and where in FIG. 13 symbol word exch2000 is another symbol word and when any part or all of this symbol word is entered, the said stored statement (sentence) for either the KM text repository of KM SQL repository/database will be sorted as in the case of FIG. 13 where the user has entered the symbol word: exch2000—could have entered other permutations of exch2000 including but not limited to the following: ch2, 2000, xch20 etc.

Reference 5

"Show me the Ews code for OLE automation using MS Excel. run the ews ole excel demo program. Get me an example of the prefetch code for the Ews application. Google what is the time in London England? Go to my SharePoint site and get the Mar. 2, 2010 CMDB proposal. Query the Remedy ATS system for users who have been approved by IT security."

Reference 6

Stored English language statements (sentences) are attached to one or more computer functions including but not limited to the following stored sentence attachments:
1) computer files
2) URLs
3) computer programs
4) English language sentences and multiple English language sentences—example see Reference 5.
5) SQL queries to other remote databases in a LAN or WAN environment
6) Combinations of items 1-5 above
7) TCP/IP, OLE, WinSock, Windows APIs, software agents and others that may apply.

Reference 7

The said application works in a remote mode in which case a remote start up sentence connects to an existing KM text repository file which, in turn, loads/open a KM SQL repository/database.

User can create instances (copies of the said application) of the said application that resides in any directory on a (WINTEL) computer in which case, the user identifies the KM text repository name used by the same said application in another directory and after doing so gives the said application instance the name of the start up sentence to use in the remote KM text repository. In this way, the master said application, can call the instance of the said application with an English language sentence and after it does, the said application instance will use the remote start up sentence to open a user specified KM SQL repository/database.

Figure 16:
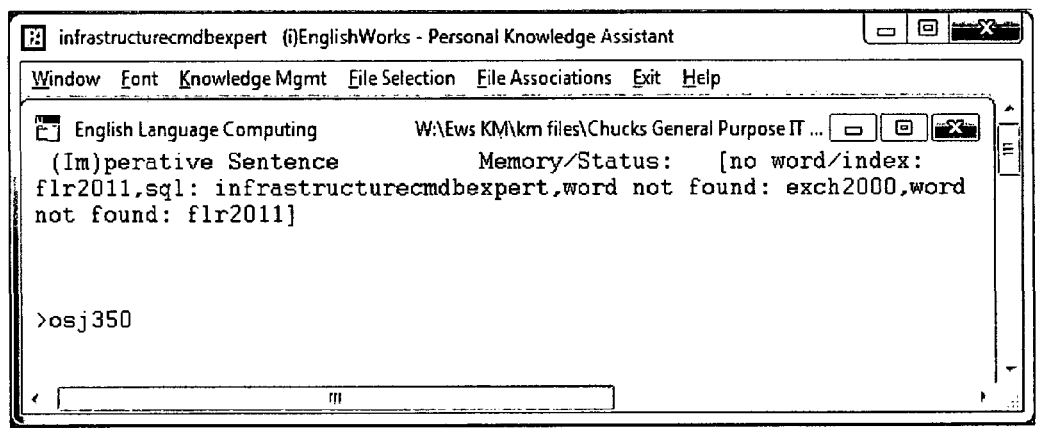
FIG. 16 is an input screen—multiple screens can exist on the desktop and, in general, each screen points to a specific KM SQL repository/database. Any screen can be opened using an English language sentence in any currently open said application screen. The said application can have application instances and share a KM text repository. The KM text repository opens all KM SQL repository/databases with English languages sentences presented at said application input FIG. 1 location 1.

This results is N number of said application screens open and ready for text input as shown in FIG. 16. In the case that the user wanted to open an instance of the said application that allowed users to get information on the said application (its help expert), the remote start up sentence would be shown in FIG. 4 line 6 which calls FIG. 4 line 4 (all words in line 6 match at least one word in line 4 and the unmatched words could be identified as symbol words and synonyms).

In this case line 4 in FIG. 4 causes line 5 to execute all the sentences after the keyword sentences: and the said application instance would allow users to get help on the operation of the said application. Note also, that a master said application could call various instances of the said application which, in turn, would allow those said application instances to open selected KM SQL repository/databases which would allow users to have access to selected KM SQL repository/database via a similar screen as shown in FIG. 16 so that will multiple said application instance screens open on the desktop, users could select various said application screen and input words or sentences to automate selected work processes.

Reference 8 see BRIEF DESCRIPTION OF DRAWINGS

Reference 9

Types of input include:
1) symbol words,
2) synonyms,
3) partial words,
4) full words
5) multiple words
6) English language statements (sentences) and multiple English language statements (sentences).

Reference 10

If more than one stored statement (sentence) contained the word architecture, for example, those statements (sentences) would be shown in group 1 (whole words, synonyms, and partial word letters beginning at the start of the word or symbol word and or occurring multiple times within a stored statement (sentence)); then group 2 (partial words that contain the input word/letters anywhere within the word occurring multiple times within a stored statements (sentences) including symbol words and synonyms); then group 3 (partial words (symbol words) that contain letters anywhere within the stored word); and then group 4 (all other words that do not contain any letters of any word in the stored statement (sentence)).

Reference 11

Similarities and differences between the KM text repository and the KM SQL repository/databases. Both repositories near match input words (because of symbol words and synonyms) to words found in the Q lines of the KM text repository (see FIG. 2 line 1) and the sentences' table for the KM SQL repository/database (see FIG. 6 lines 1, 2 and 3 and FIG. 7 lines 1, 2 and 3).

In FIG. 7 column word1 is an implicit synonym for the words: get, find, locate, open, go, show, and display while in column word10 and word11 (words: world, view) are explicit synonyms to the rest of the words stored in this row of words (by example) for the currently active KM SQL repository/database. Also in FIGS. 6 and 7 is a symbol word under column word4. Likewise, for the KM text repository FIG. 2 line 3 are the explicit symbol words, synonym, and the words for the words that match line 1 and the symbol words, synonyms, and words that don't match line 3 in line 1 are the are the implicit symbol words, synonyms and other words.

Each repository has its own drop down menu system and if the user input, for example, the single word: card and there was no stored sentence in the KM SQL repository/database, the user would select the mouse button on the KM SQL repository/database screen called: Input Selected Sentences from Text (KM) File to see any sentence that may be stored in the KM text repository.

Both menu system are inactive when a true English language sentence is input into the said application in which case if: (get card) was input and there was no stored sentence in the KM SQL repository/database but there was a stored sentence in the KM text repository, the sentence attachment would fire (execute) in the KM text repository. The KM SQL repository/database has a built in synonym database and when the user stores a sentence in the KM SQL repository/database a synonym word in automatically inserted to the respective row/column of the KM SQL repository/database. The KM text repository has no such synonym database and users must manually store synonyms in the Q lines of the KM text repositories. Both repositories depend on users to add symbol words to each repository.

Reference 12

Usage of the terms: statement (sentences) and repository and repository/database.

A) Words stored in the KM text repository and the KM SQL repository/database must be English language sentences, however words input into the said application may be referred to as statements.

B) The KM text repository is a place where words are stored in a text file. The text file is not a database and this term is traditionally reserved for SQL databases. However, the KM SQL repository/database are both a repository and a database.

What is claimed is:

1. A method of digitally storing English language sentences in Knowledge Management (KM) SQL databases using symbolic (symbol) and synonyms words, performed by an application, comprising the steps of:

providing a plurality of KM SQL databases, wherein each KM SQL database comprises at least a solution table, a sentence table and an attachment table;

digitally storing an input letter or letters comprising alpha characters, a symbol or symbols comprising non alpha characters, a word or words comprising alpha characters, and a symbol word or words comprising both alpha and non-alpha characters in the solution table wherein the solution table stores an English language sentence as input by a user, the sentence table stores each word from the solution table using synonyms, and singular form of the word as determined by a digitally stored synonym dictionary, and the attachment table is used to hold a value of a filename, a URL, a computer program, a SQL query, or a computer resource defined as a mechanism in a computer that runs a process;

digitally storing, in the solution table, a concatenated word (version) of the stored input letters, symbols, words, and symbol words from the stored English language sentence wherein the concatenated word becomes an attachment handle wherein the attachment handle associates/connects the stored English language sentence to a plurality of computer resources and wherein the attachment handle contains words in the stored English language sentence minus prepositions, nouns used as verbs in a sentence, adverbs, and verbs, and the words are concatenated together to form one word without spaces digitally storing a plurality of letters, symbols, words, synonyms, symbol words and English language sentences in the solution table to be fed back to an input of the application in response to input words or sentences from a user or from a KM repository text file or from a KM SQL database or from a software agent;

obtaining a concatenated synonym word for an input word from the digitally stored synonym dictionary, substituting said input word by said concatenated synonym word and storing said concatenated synonym word in the sentence table;

attaching a digitally stored English language sentence in the solution table to a plurality of computer resources in the attachment table, wherein the plurality of computer resources comprising URLs, computer files, computer programs, or SQL queries;

digitally storing synonym sentences wherein the synonym sentences are English language sentences worded differently but directed to perform a same function/action;

associating the synonym sentences to a same attachment handle to open a same computer resource;

providing at least one KM text repository storing English language sentences; and using the English language sentences stored in the at least one KM text repository to select and open the plurality of KM SQL databases.

2. A method to retrieve digitally stored information in KM SQL repository/database attached to digitally stored English language sentences using symbolic (symbol) and synonyms, performed by an application, comprising the steps of:

inputting letters, symbols, words, synonyms, or symbol words from an information source or from a human user at an input of the application;

nearly matching the input letters, symbols, words, synonyms, or symbol words to letters, symbols, words, synonyms, and symbol words in the digitally stored English language sentences;

displaying a subset of digitally stored English language sentences that match the input letters, symbols, words, synonyms, or symbol words in the digitally stored English language sentences;

executing a plurality of computer resources associated with a stored sentence when the input letters, symbols, words, synonyms, symbol words, or English language sentences are matched to the stored sentence that is selected by the human user using a mouse or selected by the application when the stored sentence is unique to the input letters, symbols, words, synonyms or symbol words;

displaying groups of stored English language sentences by whole word matches, then by matched letters, symbols, and words mixed with other letters, symbols, and words in a word or symbol word in a stored English language sentence, and then by remaining unmatched digitally stored English language sentences; and causing an input English language sentence to bypass the display of matching English language sentences to input letters, symbols, words, synonyms, or symbol words, and process a stored sentence's attachments including a plurality of computer resources comprising URLs, computer programs, SQL queries, files, software agents, and attached letters, symbols, words, synonyms, symbol words, and English language sentences using a word or words stored in a sentence table and related attachment handle in a solution table for the plurality of computer resources in an attachment table;

causing stored letters, symbols, words, synonyms, symbol words and English language sentences to be fed back to the input of the application from the solution table;

in response to input data received from the input of application, the application is configured to:

first check content of the KM SQL repository/database for stored English language sentences matched to the input data, if there is no match in the KM SQL repository/database, then route the input data to a KM text repository to see if there is any stored English language sentence in the KM text repository matched to the input data, if there is no match in the KM text repository, then check to see if the input data matches a Google or Googsyn query to Google or other search engines based on a start up sentence which was attached to other sentences in the KM text repository which are read by the application and allow the application to format the input data and send the format input data to Google or other search engines, and process stored English language sentence matched to the input data;

providing a plurality of KM SQL repositories/databases to store English language sentences; and using English language sentences stored in the KM text repository to select and open the plurality of KM SQL repositories/databases.

3. A method to select a data repository or search engine or software agent by a context of letters, symbols, words, synonym words, and symbol words matching stored English language sentences with letters, symbols, words, proper nouns, synonym words, and symbol words, performed by an application, comprising the steps of:
receiving input letters, symbols, words, synonyms, or symbol words at an input of the application;
searching a currently opened Knowledge Management (KM) SQL repository/database for matching stored English language sentences using the input letters, symbols, words, synonyms, or symbol words;
searching a currently opened KM text repository for matching stored English language sentences using the input letters, symbols, words, synonyms, or symbol words;
searching for non-matching stored English language sentences prefaced with a proper noun defining a sentence configuration for a search engine comprising a plurality of words including letters, symbols, words, synonyms, and English language sentences sent to search engines on local or wide area networks;
searching for non-matching stored English language sentences prefaced with a proper noun defining a sentence configuration for a software agent comprising a plurality of words including letters, symbols, words, synonyms, symbol words, and English language sentences sent to software agents on the local or wide area networks;
receiving an English language sentence from a software agent and sending corresponding letters, symbols, words, synonyms, symbol words, and English language sentences to other computers or devices or back to a sending computer on a local or wide area network;
searching the currently opened KM SQL repository/database, then the currently opened KM text repository with an input English language sentence using English language grammar rules wherein the input English language sentence must have a noun phrase and a verb phrase;
if an input is not an English language sentence then automatically presenting searched words in a KM SQL repository/database drop down menu and then allowing a user to select a KM text repository menu button to see if the searched words were found in the currently opened KM text repository;
providing a plurality of KM SQL repositories/databases; and
selecting and opening each of the plurality of KM SQL repositories/databases using English language sentences stored in the currently opened KM text repository.

4. The method of claim 3, further comprising:
receiving an input including a sequence of input letters, symbols, words, synonyms, symbol words, and English language sentences ending with a period mark character or a question mark character directed by the context of words to a repository or by proper nouns in sentences created for a search engine or software agent wherein the input to the application comes from a user; and
receiving an input including a sequence of input letters, symbols, words, synonyms, symbol words, and English language sentences ending with a period mark character or a question mark character directed by the context of words to a repository or by proper nouns in sentences created for a search engine or software agents wherein the input comes from text digitally stored in a memory device.

5. A method to store and retrieve attachments from English language sentences stored in Knowledge Management (KM) text repositories using symbolic (symbol) and synonyms words, performed by an application, comprising the steps of:
storing an English language sentence comprising letters, symbols, words, synonyms, and symbol words in a Q part of a KM text repository, wherein the English language sentence comprises at least a noun phrase and a verb phrase;
storing an attachment associated with the English language sentence in a corresponding A part of the KM text repository;
using a KM text repository menu_item of the KM text repository to display a stored sentence corresponding to the English language sentence in a KM text repository display menu;
in response to the stored sentence selected from the KM text repository display menu, using words in the KM text repository menu_item to match words in the Q part of the KM text repository and to execute the attachment in the corresponding A part of the KM text repository;
using a menu_hide_item of the KM text repository to not show a stored sentence in the KM text repository display menu; and
storing a plurality of English language sentences and attachments in the KM text repository,
wherein the KM text repository contains an A part after a key word "sentences" where sentences are stored and fed back to an input of the application when the application matches input letters, symbols, words, synonyms, symbol words, or English language sentences to a corresponding Q part of the KM text repository, and
wherein the KM text repository contains an A part after a key word "pgm" comprising computer resources as an attachment, wherein the attachment is processed when the application matches input letters, symbols, words, synonyms, symbol words, or English language sentences to find a corresponding Q part in the KM text repository, wherein the application processes the attachment to connect to the computer resources wherein the computer resources comprise URLs, computer programs, an application function or functions, letters, symbols, words, synonyms, symbol words and English language sentences wherein said English language sentences are fed back to the input of the application or processed by a software agent sending an agent name and associated sentence to another application.

* * * * *